United States Patent [19]

Gentric et al.

[11] 4,421,965
[45] Dec. 20, 1983

[54] COMMUTATOR WITH SEVERAL LAYERS OF CROSS-POINTS

[76] Inventors: Alain Gentric, 27 Lotissement Keranroux, Ploubezre 22300 Lannion; Andre Frances, 3, alleé des Ajuncs, 22300 Lannion, both of France

[21] Appl. No.: 379,058

[22] Filed: May 17, 1982

Related U.S. Application Data

[63] Continuation of Ser. No. 174,790, Aug. 4, 1980, abandoned.

[30] Foreign Application Priority Data

Aug. 16, 1979 [FR] France .................. 79 21202

[51] Int. Cl.³ ............................................. H01H 63/00
[52] U.S. Cl. ................................................... 200/175
[58] Field of Search ....................... 200/5 R, 175–179; 361/350, 352; 339/18, 19

[56] References Cited

U.S. PATENT DOCUMENTS

| | | | |
|---|---|---|---|
| 3,049,645 | 8/1962 | Skirpan | 339/18 R X |
| 3,151,923 | 10/1964 | Bell et al. | 339/18 C |
| 3,212,048 | 10/1965 | Rosenberg et al. | 339/18 R |
| 3,225,322 | 12/1965 | Reel | 361/352 X |
| 3,258,730 | 6/1966 | Husband et al. | 339/18 C |
| 3,312,792 | 4/1967 | Machado, Jr. et al. | 200/175 X |
| 3,349,361 | 10/1967 | Cartelli | 339/18 R |

Primary Examiner—J. R. Scott
Attorney, Agent, or Firm—Laff, Whitesel, Conte & Saret

[57] ABSTRACT

A multilayer cross point matrix switch is composed of orthoigonally arranged first and second layers of spaced parallel conductors mounted on insulating guides having window arrays for placement of plugs to interconnect discrete first and second conductors of different layers at a given crosspoint. The plugs contain conductor surfaces occupying an angular sector of approximately 180 degrees. The crosspoint switches are opened or closed by one quarter of a rotation of the plug in one direction or another direction. The plugs are selectively rotated by selection bars having flexible teeth engaging a cresent-shaped head on each plug. Several types of actuating mechanisms for operating the cross-point switches are disclosed.

18 Claims, 48 Drawing Figures

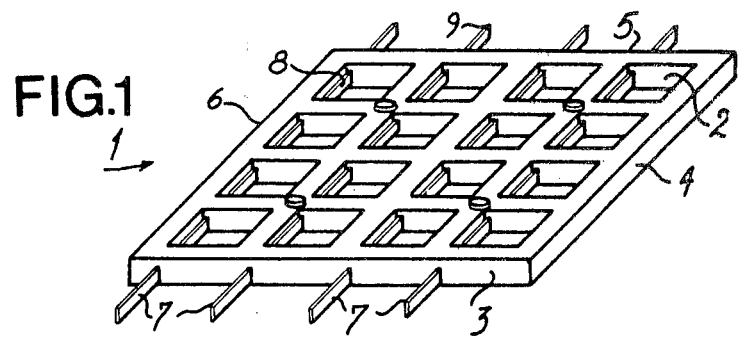
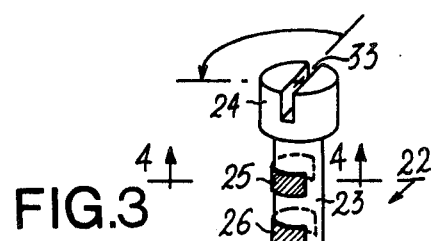
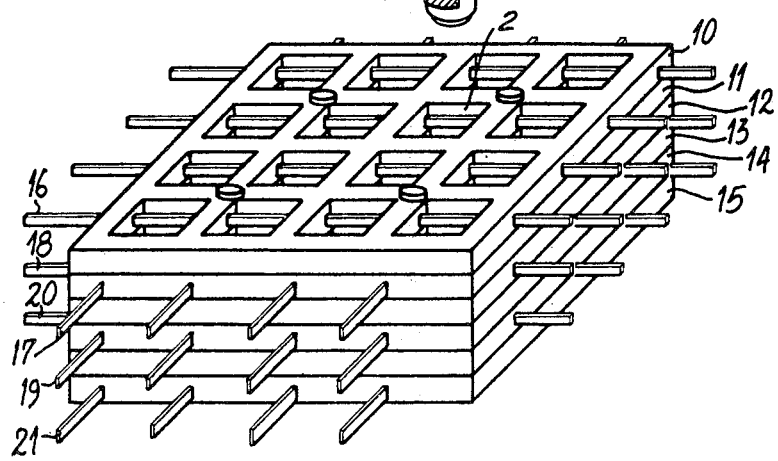
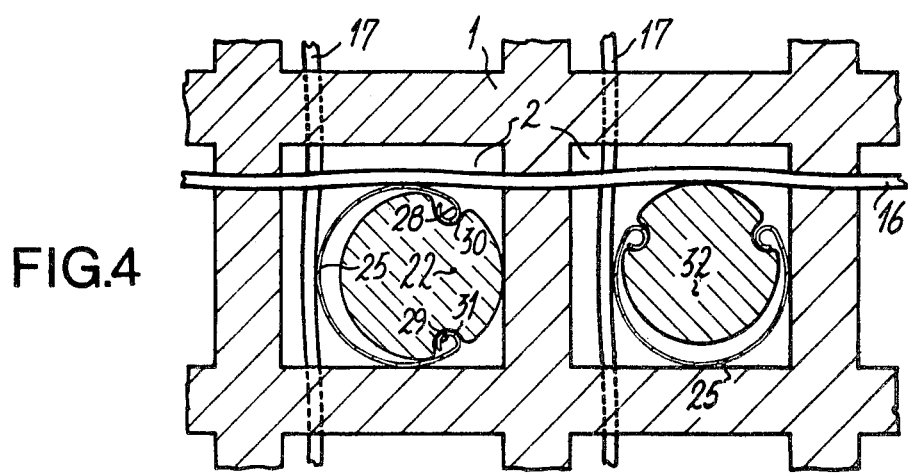

UNOPERATED
CROSS POINT

OPERATE
CROSS POINT

RELEASE
CROSS POINT

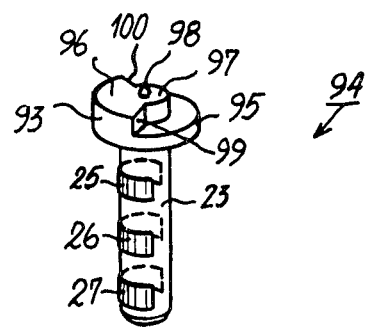
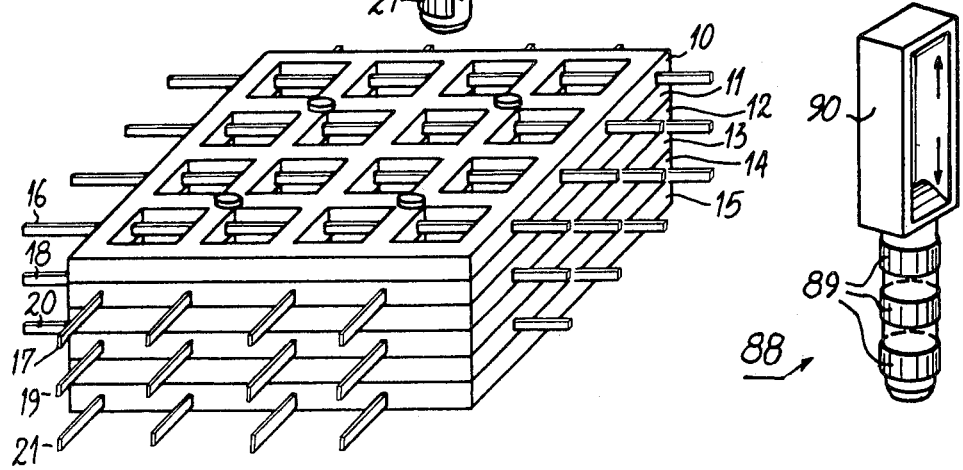
FIG.17
FIG.18

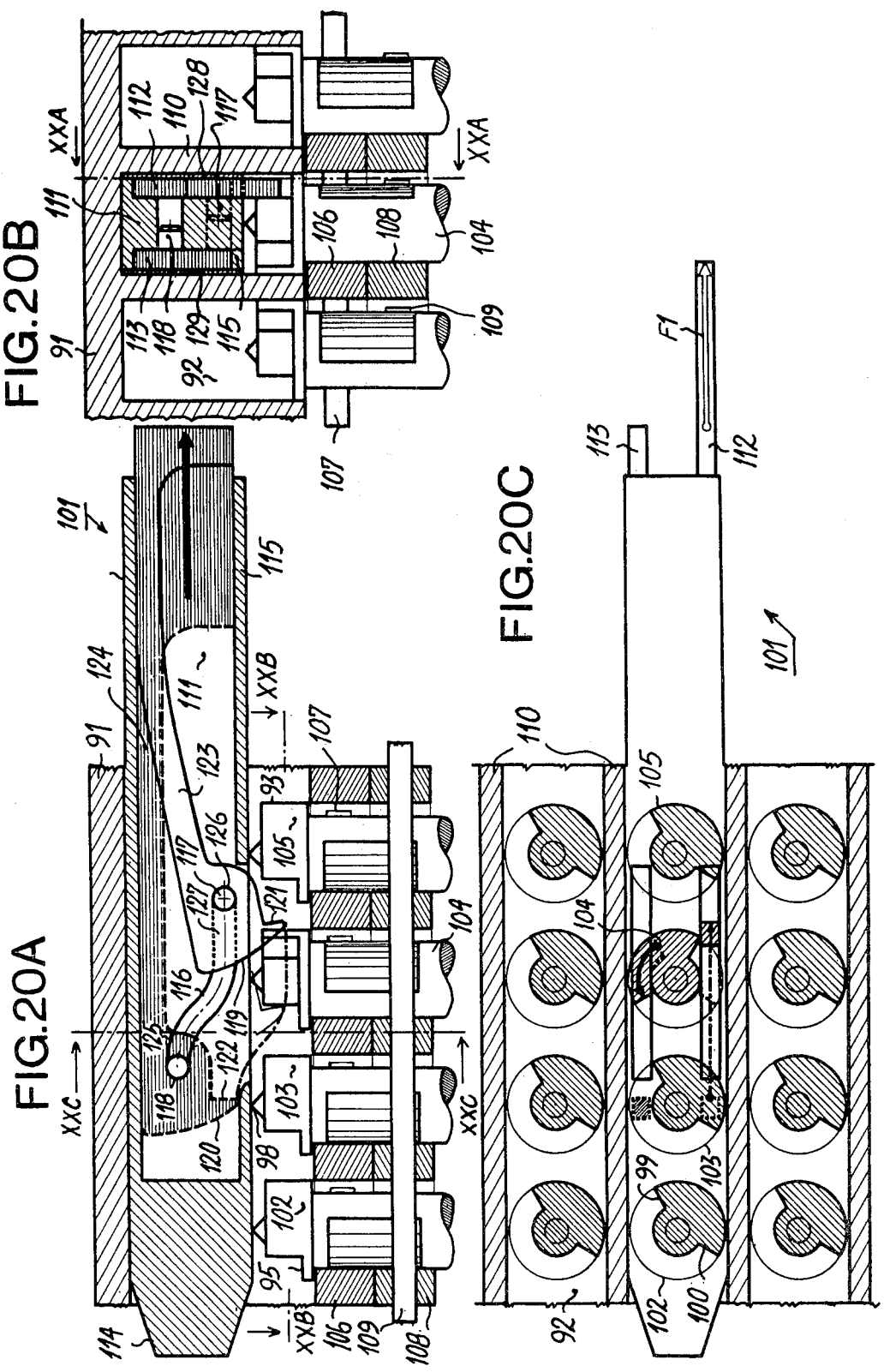

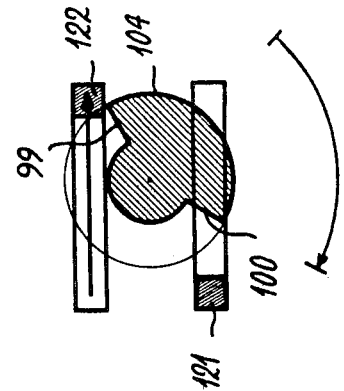
FIG.21C RELEASE OF CROSS POINT
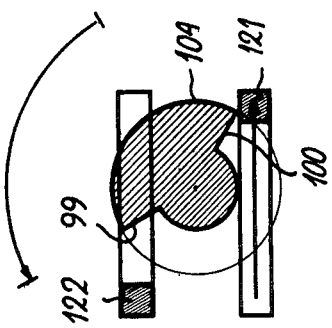
FIG.21B OPERATE CROSS POINT
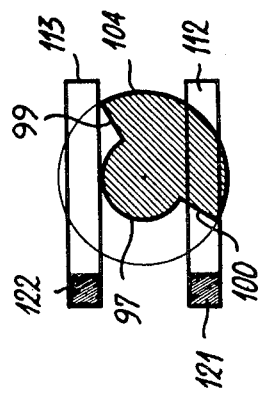
FIG.21A UNOPERATED CROSS POINT

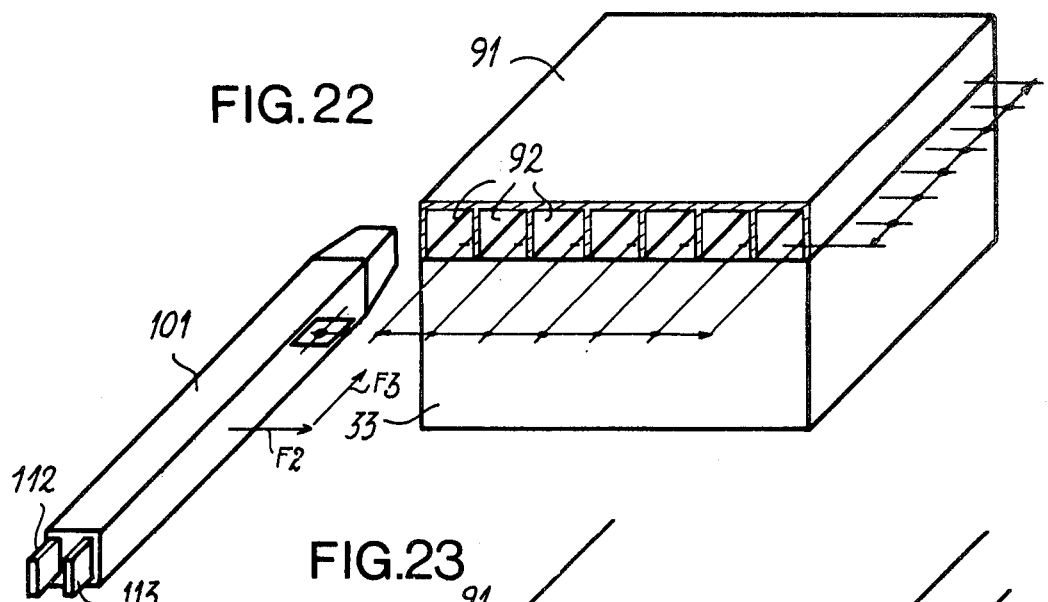
FIG.22
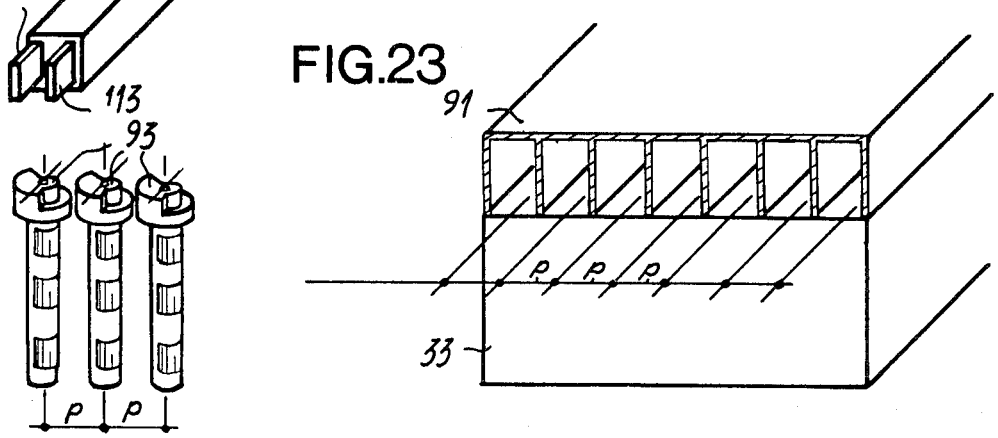
FIG.23
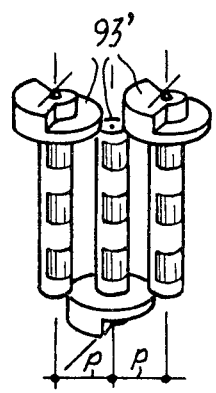
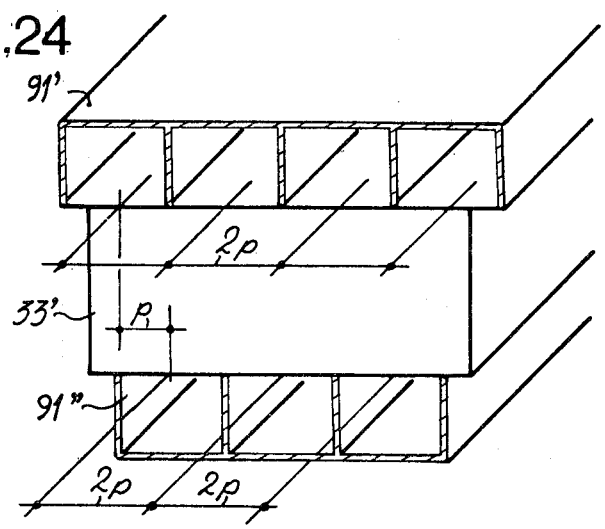
FIG.24

SWITCHING MATRIX

STEP-BY-STEP CROSS POINT CONTROLLER

CROSS POINT OPERATOR

MANUAL TOOL FOR
OPERATING CROSS POINT
IN STEP-BY-STEP MATRIX

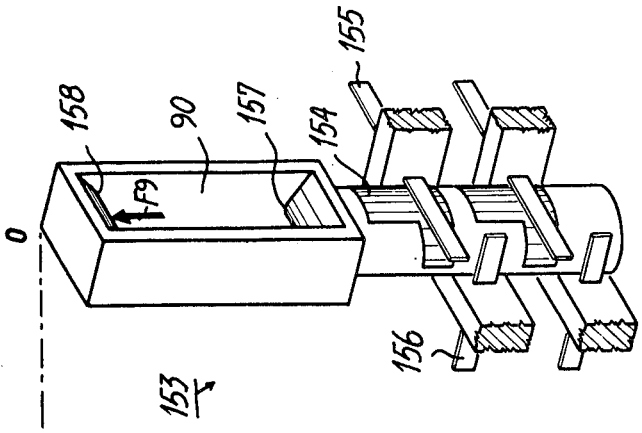
FIG.30A UNOPERATED CROSS POINT
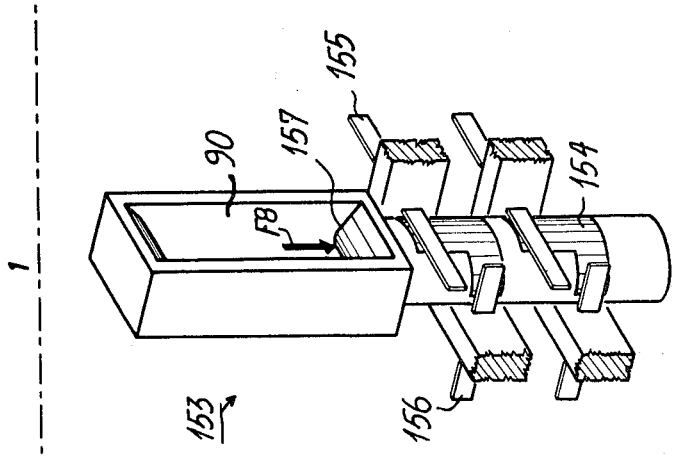
FIG.30B OPERATE CROSS POINT
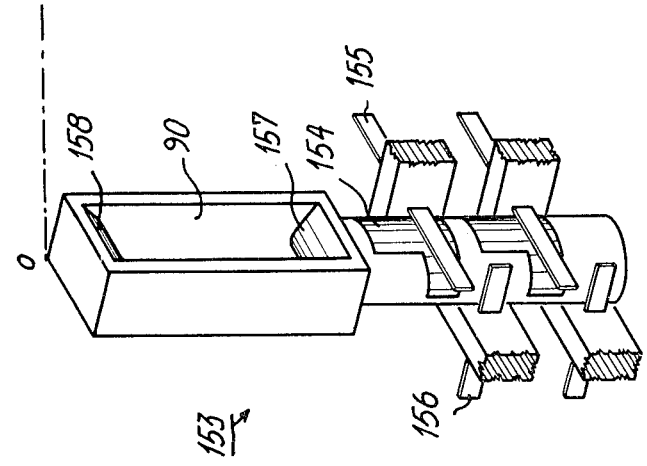
FIG.30C RELEASE CROSS POINT

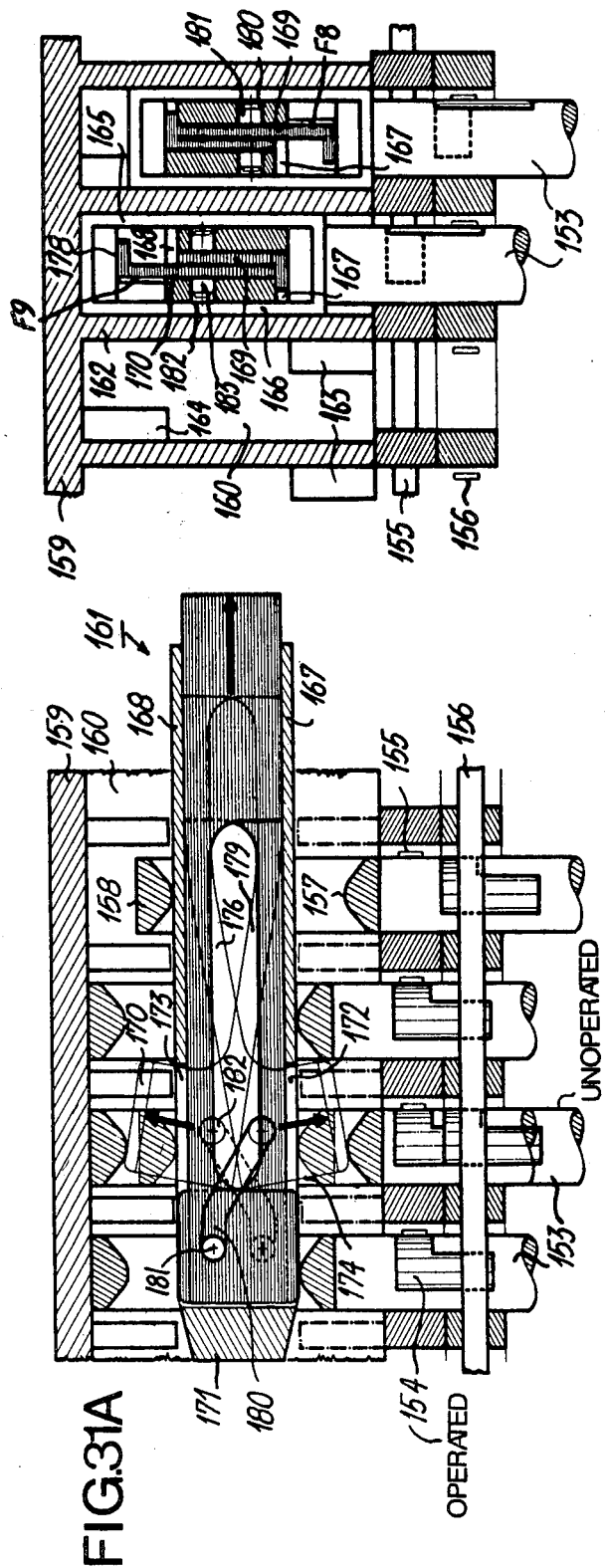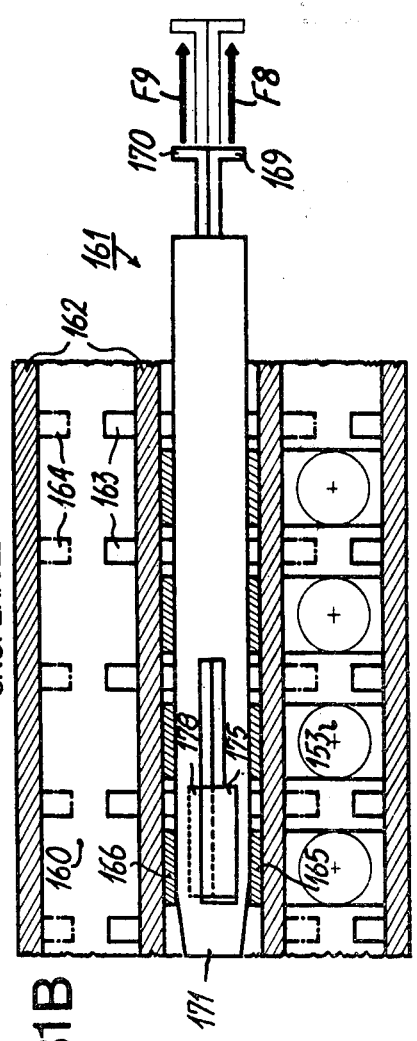
FIG.31A
FIG.31B
FIG.31C

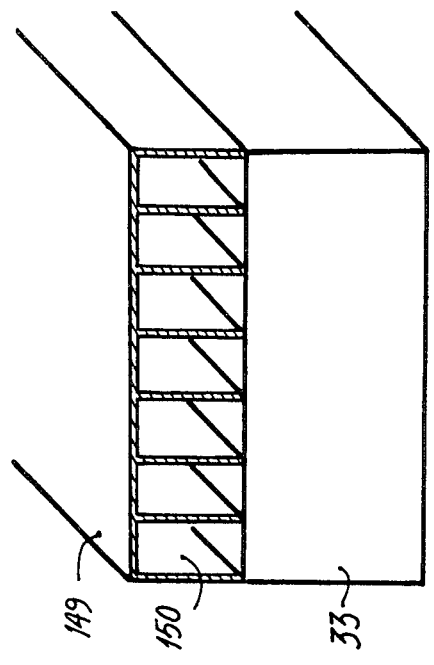
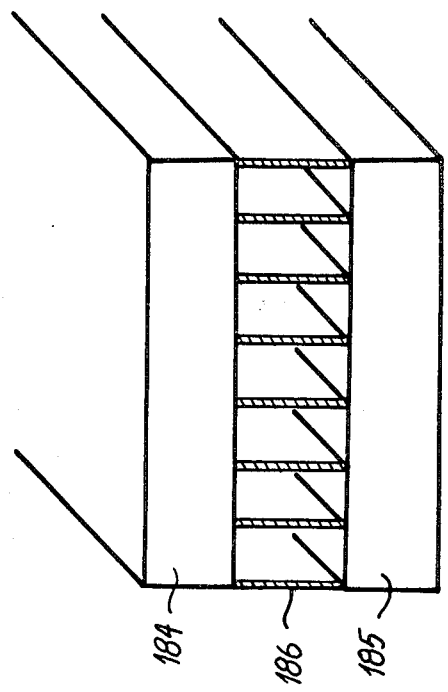
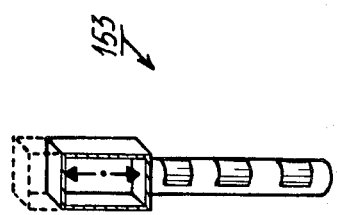
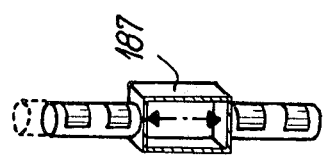
FIG.32A
FIG.33A
FIG.32B
FIG.33B

COMMUTATOR WITH SEVERAL LAYERS OF CROSS-POINTS

This is a continuation of application Ser. No. 174,790 filed Aug. 4, 1980.

The present invention relates to a matrix-type switch with several usable layers of cross points, especially, in telephone distribution, or other switching systems, or in similar devices. More especially, the invention relates to such a switch with cross point selection by means of coordinates.

DISCUSSION OF PRIOR ART

The cross-bar type of telephone switches are and have been well known for a long time. Recently, developed switches have had several layers, such as those described in French Pat. Nos. 1 583 604 and 2 106 738. Those switches are composed of several first layers of parallel wires oriented in a first direction, and of several second layers of parallel wires, inserted in between the first layers and oriented in a direction perpendicular to the first layers. There are thus defined, in a direction perpendicular to the layers of wires, multiple cross points which are either closed or open by devices similar to multicontact plugs which are displaced in a direction perpendicular to the layers. In French Pat. No. 2 038 044, multicontact plugs rotate in order to close or to break the cross point contacts. Those switches constitute rapidly operating switches which are used for establishing communications among telephone subscribers.

Moreover, in a general distribution station, it is necessary to be able to connect, without any blocking, an input circuit to an output circuit. The term "blocking" means that a switch path cannot be completed through a network, not because all paths are busy, but because a path took the wrong turn and ran into a busy cross point. The filling of the distribution station depends first of all on the demand from the subscribers. In a conventional manner, input and output cables are connected to vertical heads, and to small horizontal rulers, at the time of the switch installation. Since it is desired to set up a connection, the input circuit is connected to the chosen output circuit by means of connecting wires. Those connecting wires have two wires in the case of a telephone subscriber, and up to seven wires in the case of low frequency transmission circuits.

Under conditions of normal use, it often is necessary to modify the wiring of the distribution station. It is possible to assume that the connecting wires are, on the average, moved once a year. When the connecting wires are very numerous, their weight and the entanglements which they cause, little by little, make it impossible to remove them from the distribution station; therefore, some new wires are always added, which leads to a situation which clogs the conduits even more. Maintaining access to the various points of the distribution station makes it necessary to space the elements, that is to say, to increase the dimensions of the same, which requires the presence of several agents. Thus, it is difficult to mechanize the supervision and operation work of said distribution stations.

One object of the present invention is to provide a switch which makes it possible to construct distribution stations which avoid the above-mentioned drawbacks.

French Pat. No. 2 284 240 describes an automatic distribution station system, with matrix-type switches, which are constituted by pin-equipped printed circuit cards, associated with the conductors. The cards are movable in recessed areas of the frame where they are connected by means of flexible flat cables. For each operation, it is necessary to take a card out, to position a connector, in the form of a strap, over the pins of the chosen cross point, and then to put the card back into place. That maneuver or operation has to be repeated as many times as there are contacts per circuit, a situation which is not convenient and which constitutes a source of errors. In addition, the apparent simplicity of the system is compensated by the concomitant complexity of the automatic devices of the system.

SUMMARY OF INVENTION

One object of the present invention is to provide a matrix-type switch, with several layers of plug-type cross points, which may be used, especially, in telephone distribution stations. The invention avoids the above-mentioned drawbacks and can be made automatically, in a relatively simple manner.

Another object of the invention is to provide for a switch of a type, wherein the switching plugs can be rotated in order to establish or to cut off the connection.

Another object of the invention is to provide a governing member capable of causing a switching plug to rotate in a selective manner, in the plug matrix associated with the cross points of the switching matrix.

According to one characteristic of the present invention, a switch with several layers of cross points is composed of several first layers of parallel wires oriented in a first direction. Several second layers of wires or conductors are oriented in a direction perpendicular to the first layers. The first and second layers are intercolated, each layer of wires being supported by a grid of insulated material featuring a square mesh. Each mesh has running through it a wire or conductor parallel to one of its sides, the grids of the second layers being angularly shifted by one quarter of a rotation, all in the same direction, relative to the grids of the first layers. A cross point is constituted by two superposed adjacent meshes. A conductor surface of a plug electrically connects the wire segment of the upper mesh to the wire segment of the lower mesh.

According to another characteristic, each plug is fitted into a pile of cross points. The plug has as many conductive cylindrical rings as there are superposed cross points. Each ring has a height which constitutes the conductive surface of a single cross point.

According to another characteristic, each plug is fitted into a pile of cross points which have as many sectors of conductor cylindrical rings as there are superposed cross points. Each ring sector has a height and an angle at the summit which are adapted to constitute the conductive surface of a cross point.

According to another characteristic, the plugs have crescent-shaped heads, the horn tips of which cooperate with the flexible teeth of selection bars which can be deformed by the working bars. The selection and working bars are crossed, each selection bar being pushed in a direction which determines, with each working bar when operated, the rotation of a plug head by a quarter of a rotation in one direction, and pulled, in the other direction which determines, with an adjacent working bar which is operated, the rotation of the head by one quarter of a rotation in the other direction.

Another object of the present invention is to provide a governing member for rotating the plug head, which requires access to only one face of the switch, while preserving the advantages of the switches described in the main patent application.

Another object of the present invention is to provide a governing member for the plug heads which are movable in translation. In the same manner, the member requires access to only one face of the switch, while preserving the advantages of the above-indicated switches.

According to one characteristic of the present invention, a switch includes a switching member comprising two parallel rods, the active ends of which are each fitted with a hook which may be lowered (or raised) in conjunction with a translation motion of the corresponding rod. The lowered (or raised) hook of a rod drives along one of the two hooking faces of the switching plug head in one direction. This causes the plug to rotate by one quarter of a rotation in one direction. The hook of the other rod is lowered (or raised) to drive along the other hooking face, on the head of the plug. This causes the plug to rotate by one quarter of a rotation in the other direction.

According to another characteristic, the active end of each rod presents a flat head connected to the body of the rod by a flexible part. The head bears a stud engaged in a slit of a rigid plate of the governing member. The slit has, in a vertical plane, the shape of an S, such that the translation motion of the rod in the member causes the displacement of the stud in the slit. This displacement causes the stud to move downwardly (or upwardly). Then, at the end of its trajectory, a simple translation motion places the hook of the head in a trajectory which is parallel to that of the stud.

According to another characteristic, a switch comprises a switching member with two parallel rods, the active ends of which are each fitted with a pusher which may be lowered (or raised) in conjunction with a translation motion of the corresponding rod. The lowered (or raised) pusher drives along one of the lateral sides of the frame which constitutes the head of the plug. This causes the plug to move downwardly (or upwardly) in the pile, a rod being associated with a pusher which moves downwardly and the other one with an upwardly moving pusher.

According to another characteristic, the plug heads comprise a low cylindrical part and a high part in the shape of a circular sector, presenting a swollen cylindrical part in its center, the sector having an angle at the center of slightly less than 180°.

According to another characteristic, the center of the swollen cylindrical part has, above it, a cone-shaped pivot.

The above indicated characteristics of the invention, as well as othrs, will appear more clearly upon reading of the following description of embodiments, with the description being given relative to the attached drawing, in which:

FIG. 1 is a perspective view of an embodiment of a switching element;

FIG. 2 is a perspective view of a known plug;

FIG. 3 is an exploded view of a pile-up, according to the invention, of elements according to FIG. 1, as well as of a rotation switching plug;

FIG. 4 is a schematic view, taken in a plan which illustrates the functioning of the pile-up in FIG. 2 (the cross section of the plug being taken along lines 4—4 of FIG. 2);

FIG. 17 is an exploded view of a pile-up of elements according to FIG. 1, as well as of a variation of a switching plug according to the present invention;

FIG. 18 is a perspective view of a variation of the plug in FIG. 2, according to the present invention;

FIGS. 20A to 20C respectively, are elevated and plan views and an end view of the active part of a switching control or governing member suitable for operating plugs in FIG. 17

Figure 10:
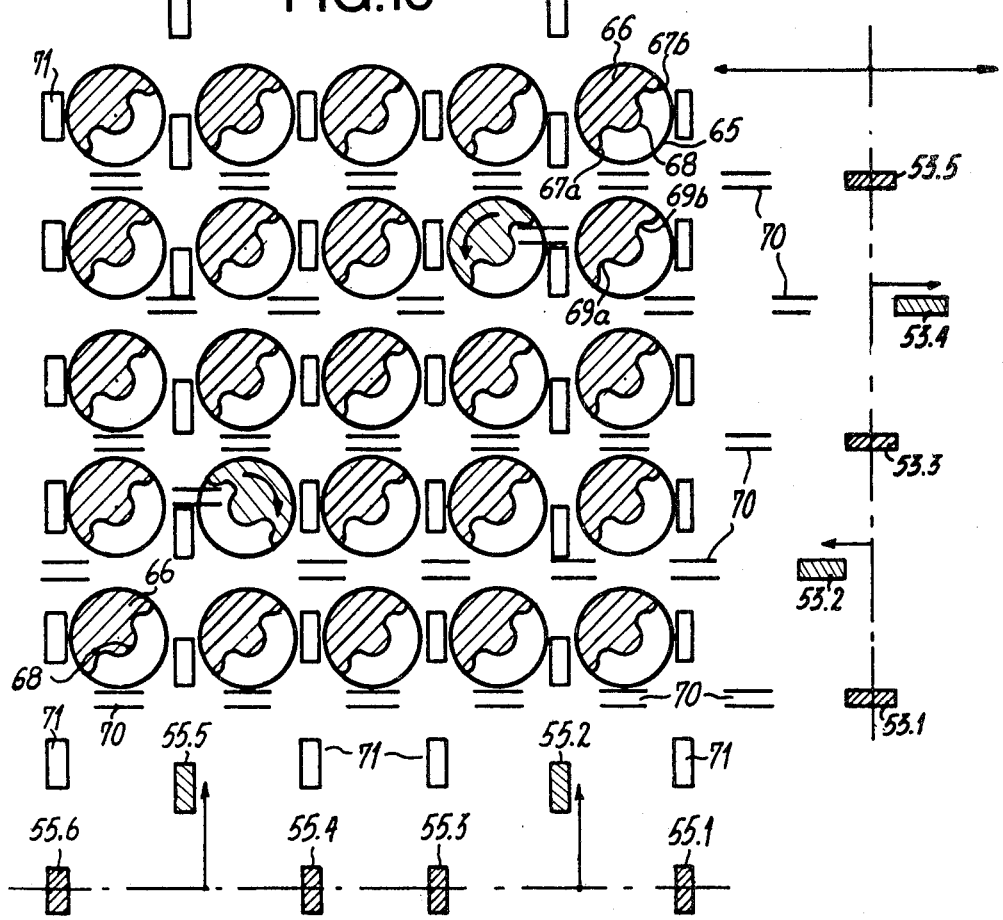
FIG. 10 is a schematic view of a matrix taken in a plane looking down on the tops of the operating plugs which illustrates the functioning of the cross points, according to FIGS. 9A to 9C, in one governing or control module.
Figure 19:
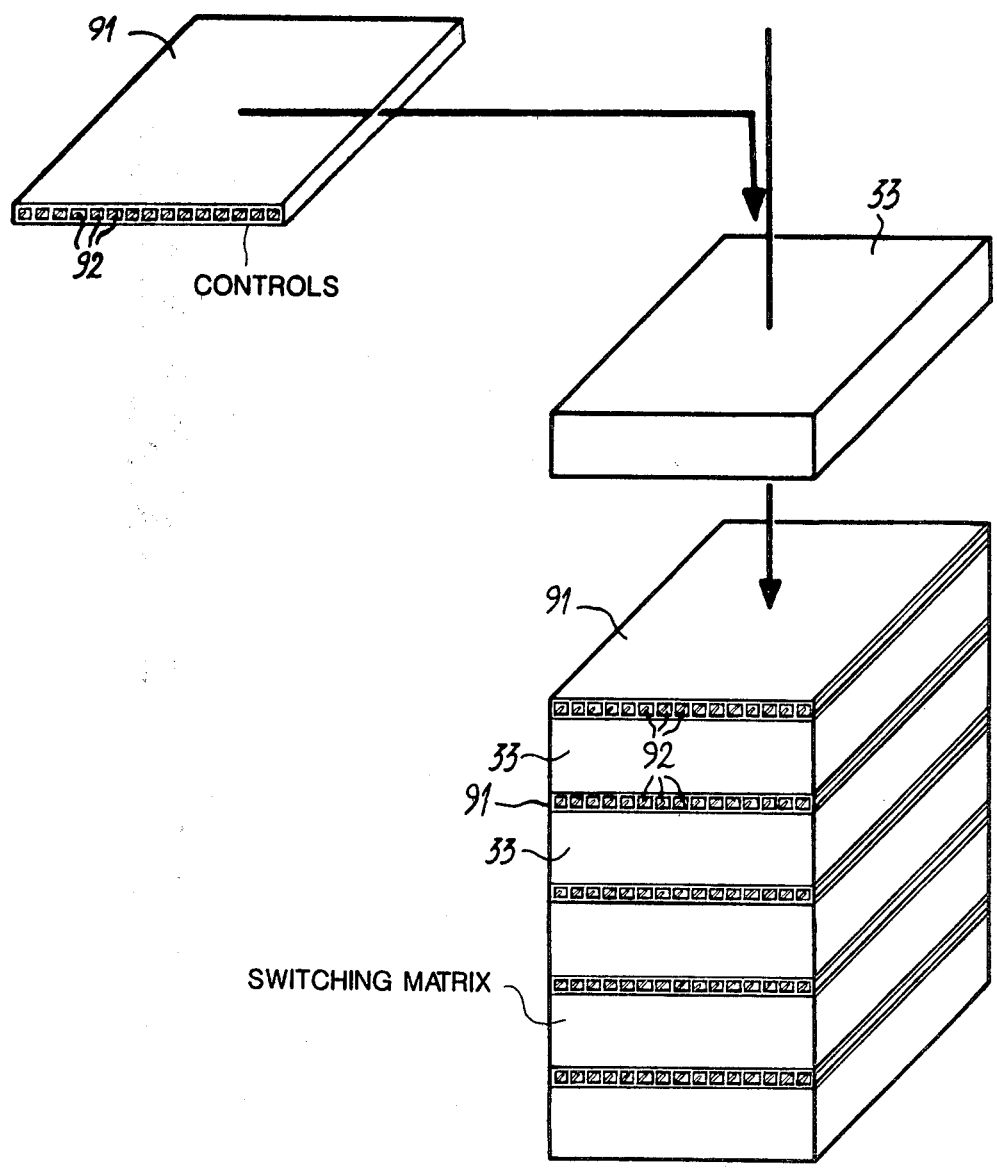
FIG. 19 is a view of a pile which is formed by a plurality of pile-ups suitable for the plugs in FIG. 17.
Figure 25:
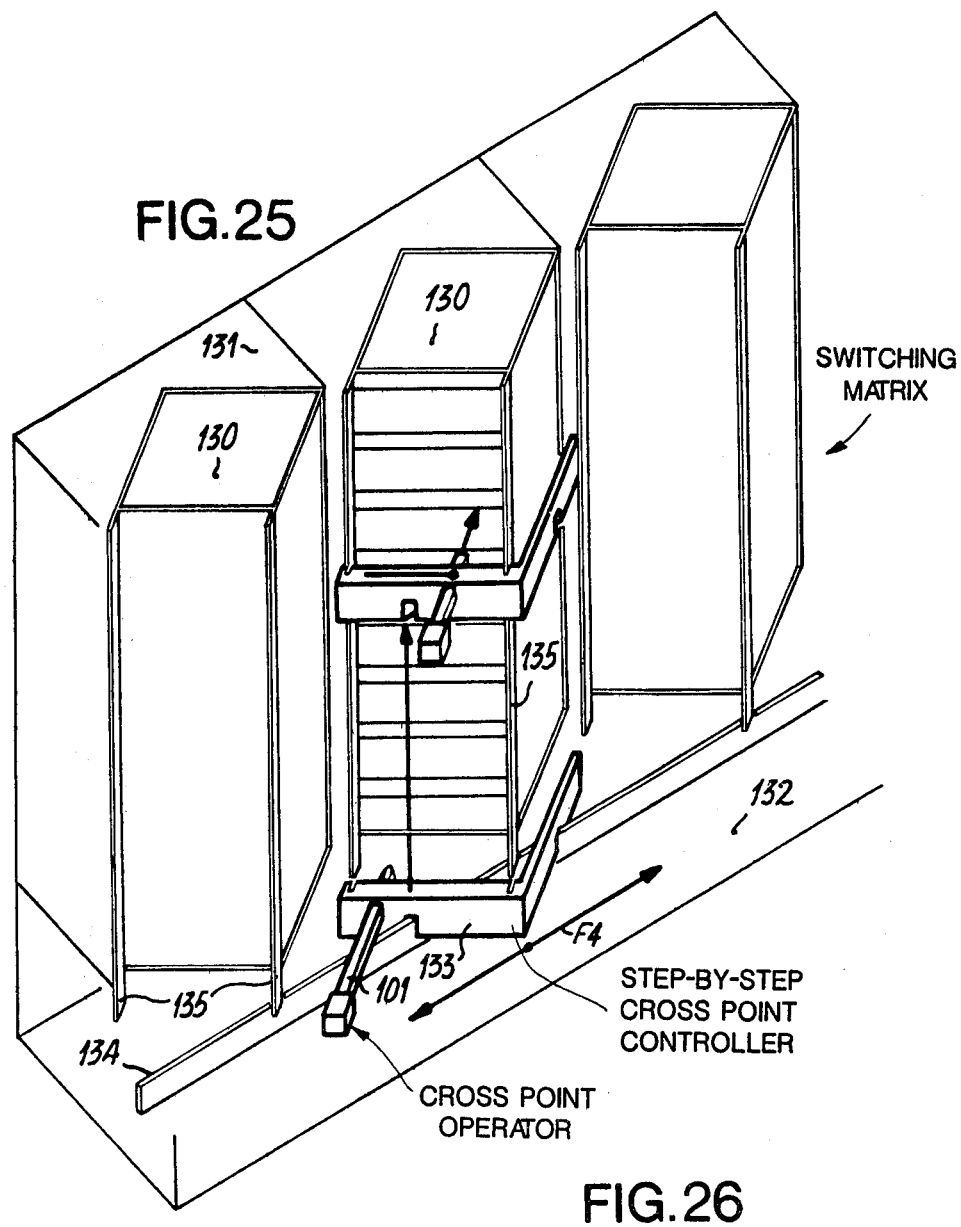
Figure 26:
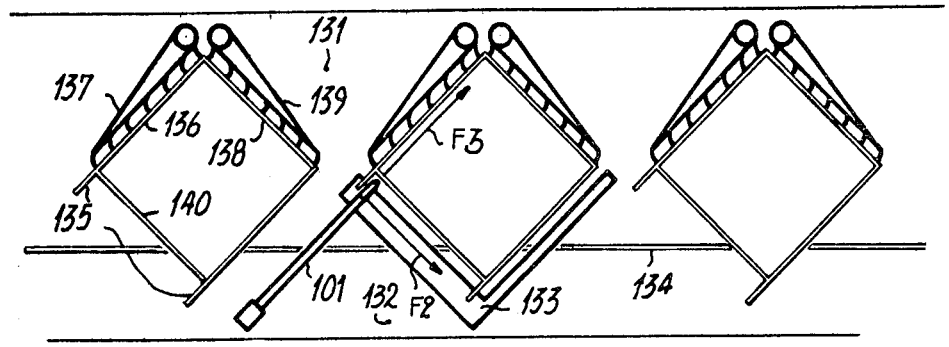
Figure 27:
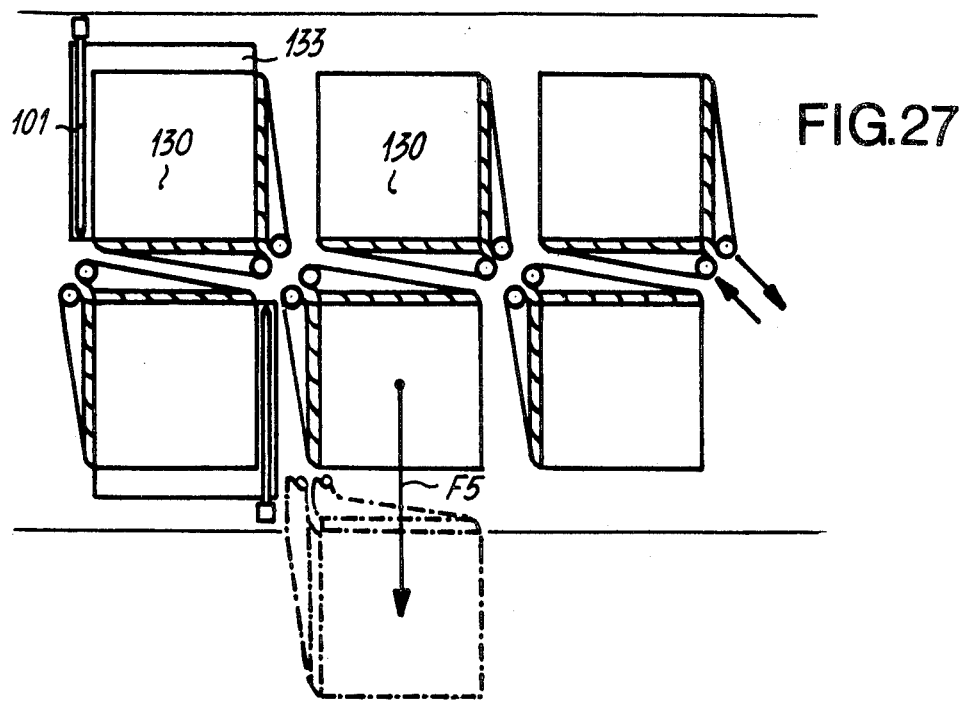
Figure 28:
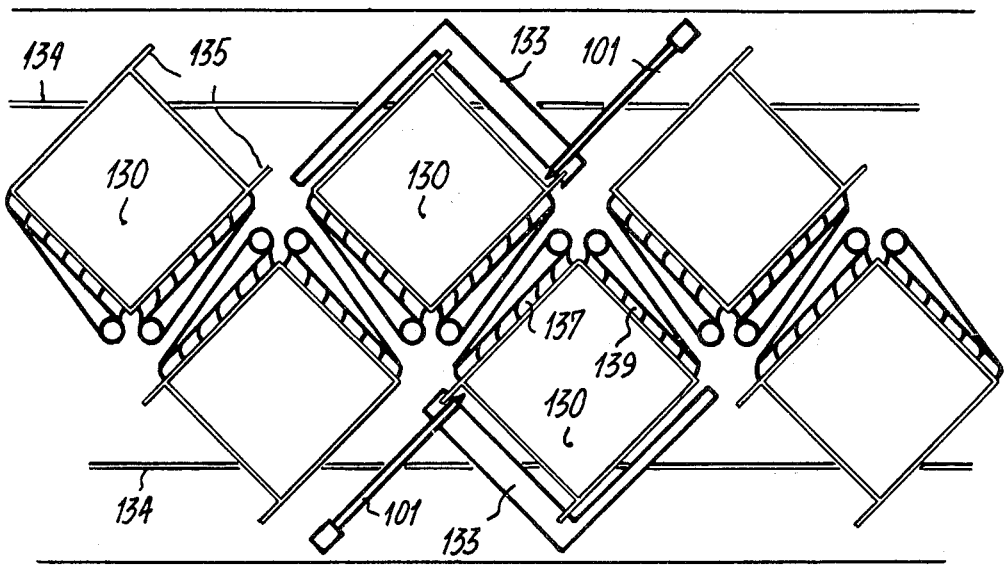

(FIG. 20A is a cross section taken along line XXA—XXA of FIG. 20B; FIG. 20B is taken along line XXB—XXB of FIG. 20A; FIG. 20C is taken along line XXC—XXC of FIG. 20A);

FIGS. 21A to 21C are schematic views which show the changes of status of a switching plug, according to FIG. 17;

FIG. 22 is a schematic view which illustrates the positioning of the governing member in FIGS. 20A to 20C;

FIG. 23 is a schematic view which shows a first example of orientation of the plugs;

FIG. 24 is a view which shows a second example of the orientation of the plugs;

FIG. 25 is a view which illustrates the position of the piles, according to FIG. 19, associated with a system for the positioning of governing or control members;

FIG. 26 is a plan view of the complex formed by the piles in FIG. 25;

FIG. 27 shows a variation of the arrangement in FIG. 26;

FIG. 28 is a view of another variation in the arrangement;

FIGS. 29A to 29D are schematic views, in perspective, of a hand tool for governing the switching of the plugs, the object of which is the same as that of the member in FIGS. 20A to 20C;

FIGS. 30A to 30C are partial, stop motion views of a plug, similar to the one in FIG. 10, the three figures respectively showing the plug at rest, when passing to its work position, and when returning to its rest position;

FIGS. 31A to 31C respectively, are elevated, plan and end views, with sections, of a switching governing member capable of governing the plug in FIGS. 30A to 30C;

FIG. 32A is a schematic view of a pile-up with all of the plugs, according to FIGS. 30A to 30C oriented in the same direction;

FIG. 32B shows plugs for use in FIG. 23A

FIG. 33A is a schematic view of the stationary part of a pile-up using variations of the plugs in FIGS. 30A to 30C; and FIG. 33B shows plugs for use in FIG. 33A.

BASIC MATRIX FIGS. 1-4

The switching element in FIG. 1 is constituted by a square grid 1 made of insulating plastic material, which presents square openings 2 forming alignments which are parallel to the external sides 3 to 6 of the grid. In the alignments, openings 2 are evenly spaced. A plurality of spaced parallel metal strips or beams 7 run from one side to the other side of grid 1, in a direction perpendicular to sides 3 and 5. Each conductive beam 7 runs through an alignment of openings 2 which is parallel to sides 4 and 6. Within each opening through which it runs, the beam 7 presents a visible segment 8. The height of each beam 7 is less than the thickness of grid 1. The longitudinal axis of beam 7 is the median plane of the grid. As also indicated in FIG. 1, in each opening 2, the associated segment 8 does not run through the center of opening 2, but is shifted by a distance toward the side of the opening. FIG. 1 indicates that all of the beams in a grid are shifted in the same direction, relative to the centers of the openings through which they run. The ends 9 of beams 7, are located outside of the grid, and serve as terminals for connecting the beams to connecting cables. Beams 7 conduct electricity, and they are manufactured of a material having an elasticity which is compatible with a reasonable contact pressure.

Plug 49 in FIG. 2 is a plug of a known type. It comprises a cylindrical body around which there are provided circular rings 50, of contact material, having the same height as contact 25, and separated from one another, as shown at 25, 26, 27. The head 51 of plug 49 does not have any screw driver type slit, as shown at 33. In practice, plug 49 can be plugged in by hand into pile 35 (FIG. 5) to create there, contacts by plugging in. This hand construction is something which may prove interesting in rudimentary switches. In this case (FIG. 2), in order to saturate a matrix, it is sufficient to have a number of plugs 49 equal to the number of beams 7 on the shortest side of the matrix.

FIG. 3 shows a pile of grids 10 to 15, all of which are identical to grid 1. Layers 16, 18 and 20 of grids 10, 12, 14 are oriented in one direction perpendicular to layers 17, 19, 21 of grids 11, 13 and 15. FIGS. 3 also shows a plug 22 comprising a cylindrical body 23 fitted with a head 24, the plug complex 23, 24 being made of an electrically insulating plastic material. Body 23 carries small contact blades 25, 26 and 27, all identical, of a metal or alloy having good electrical conduction qualities. Small contact blades 25 to 27 are evenly spaced along the plug body 23. They do not completely surround body 23 and their height is of the order of the thickness of a grid, plus the height of a beam 7.

In FIG. 4, there is shown the cross section of plug 22 (taken along line 4—4 (FIG. 3)) in the plane running through small contact blade 25. It is seen that the diameter of plug body 23 is less than the dimensions of window 2, so that body 23 alone can be introduced into a grid opening without simultaneously bearing on the edges of the grid and on beam segment 8 (FIG. 1). The section of small contact blade 25 is substantially that of an arc of circle of 270°, the diameter of the circle of 25 being greater than the diameter of body 23. The end edges 28 and 29 of contact blade 25 are wound on themselves, and lodged in longitudinal grooves 30 and 31, hollowed out in body 23. Considering the diameter difference between contact blade 25 and plug body 23, the small blade 25 progressively moves away from the surface of 23, from its edges 28 and 29. The diameter of contact blade 25 is such that the complex formed by body 23 and small contact blade 25 come in contact with the sides of the square opening formed by beam 16, beam 17, and the opposing faces of the corresponding openings. Under those conditions, small contact blades 25, 26, 27 become deformed, and balance each other to provide contact pressure, thus permitting easier rotations.

As indicated above, the height of small contact blade 25 is greater than the thickness of a grid, but less than double that thickness. Therefore, small contact blade 25 can come into contact simultaneously with beams 16 and 17.

In fact, FIG. 4 shows plug 22 in its working position, contact 25 being in contact with beams 16 and 17. FIG. 4 also shows a second plug 32, identical with plug 22, but turned by one quarter of a rotation, in a counterclockwise direction so that contact blade 25 no longer is in contact with beam 16 alone. Plug 32 is in its rest position.

Head 24 of plug 22 is fitted with a slit or groove 33 (similar to a screw driver slit), thus making it possible to cause the plug to rotate counterclockwise by one quarter of a rotation, or to cause it to rotate in the clockwise direction to set it at rest or again to a work position. It will be noted that, if plug 22 is caused to rotate by one quarter of a turn clockwise, it remains in its working position. In practice, as will be seen below, when describing the control or governing device, plug 22 can take only two positions, without any ambiguity.

With reference again to FIG. 3, it can be seen that when pushing plug 22 into an opening of the pile, three superposed and independent cross points are made, one of them between a beam of layer 16 and a beam of layer 17, the second between a beam of layer 18 and a beam of layer 19, and the third one between a beam of layer 20 and a beam of layer 21.

The pile up of grid layers in FIG. 3, in which each grid comprises 4×4 openings 2, makes possible the inserting of four plugs per row or column, such as 22 and the simultaneous operation of four of them, to execute four distinct connections. In practice, it is necessary to provide matrices of larger sizes and piles comprising more than six grids. The pile in FIG. 3 is shown only as an example in order to illustrate the basic structure of the switch according to the present invention.

ASSEMBLY OF BASIC MATRICES INTO SWITCHING NETWORK FIGS. 5-8

Figure 5:
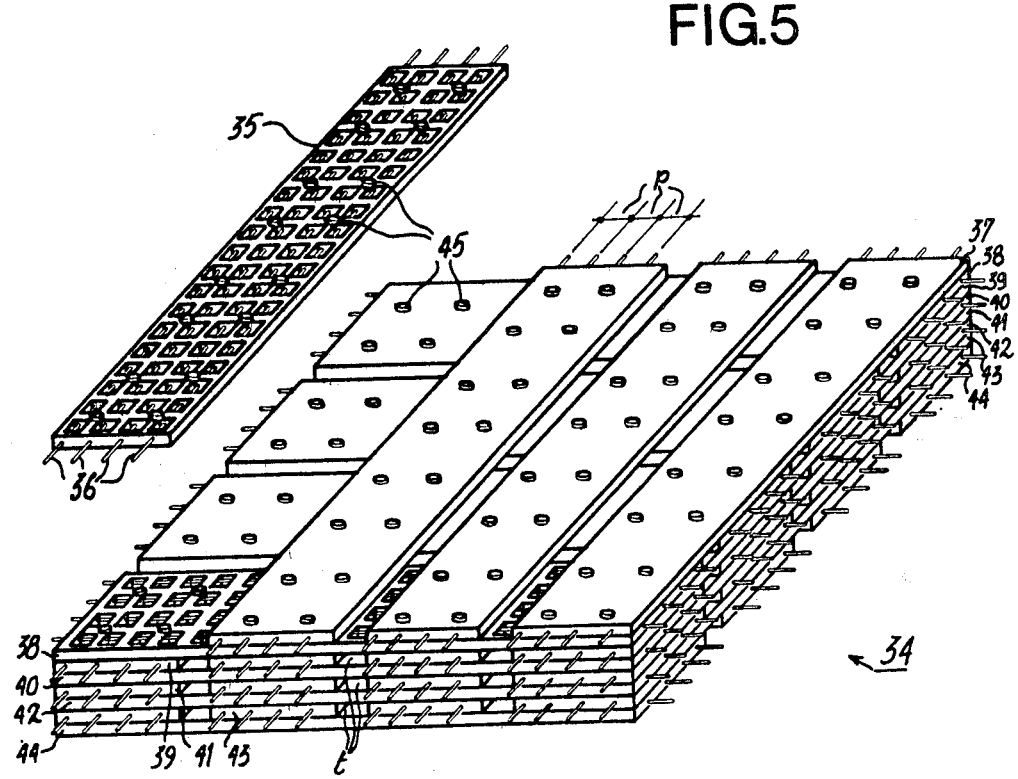
FIG. 5 is a perspective exploded view, of a pile-up with longer elements, derived from FIG. 2.

In FIG. 5, there is a pile 34 made from elongated grids, such as grid 35, which is represented prior to its being set into place on the pile. Grid 35 has a rectangular shape comprising four rows of openings 2, each row comprising 19 openings. Grid 35 is traversed by a layer of four conductor beams 36, each one of which respectively runs through one line of openings, parallel to the length of grid 35. The respective positions of the bare segments of the beams are identical to those in grid 1. In fact, grid 35 distinguishes itself from grid 1 only by the fact that, in one direction, it comprises a larger number of openings.

Pile 34 is formed of either levels 37 to 44, each level being formed by four grids 35 placed side by side, and parallel to one another, their larger sides being adjacent. In each level, the adjacent grids 35 are separated from each other by an interval t which is equal to the step (pitch) of the openings in grid 35. The grids of the uneven (odd) levels 37, 39, 41 and 43 are oriented in the same direction, while the grids of the even levels 38, 40, 42 and 44 are oriented in a direction perpendicular thereto. The levels being superposed, the openings create vertical line-ups as shown in the pile in FIG. 3. With four lines of holes or openings per grid, plus three intervals having the width of a row of openings between the grids, we have $4-4+3\times 1=19$ lines of holes or openings per level, this corresponding to 19 openings per line to form a square section pile. It must, however, be noted that the lines of the intervals are not usable. Thus, in each level, there is a $16\times 16$ matrix which is usable. Such a pile makes it thus possible to complete 16 connections having four contacts each.

In a more general manner, a grid of the type of 35 (FIG. 5) is composed of n lines of openings, this corresponding to a layer of n parallel conductor beams with a step or pitch of p. Each line may comprise q openings. In the case of a square matrix, if there are k parallel grids per level, with an interval of t lines between adjacent grids, there is the relationship:

$$q=kn+(k-1)t$$

The length and the width are then obtained by multiplying n and q by the step or pitch p. It is also possible to provide for rectangular matrices. For the man skilled in the art, it is easy to find the modular dimensions of the grids which are connected to the input side of the switch, and of the grids connected to the output side.

As an example, a base grid may comprise a layer of 10 conductors with a step or pitch of 5 mm. Each conductor has a section of $1\times 0.2$ mm, and the grid, with a thickness of 2.5 mm is molded above the layer. The length of a grid may reach 120 steps or pitches, or more. In order to obtain the grids, there is manufactured a very long strip molded over a layer of wires. Then, the strip is cut up at the desired length.

Figure 6:
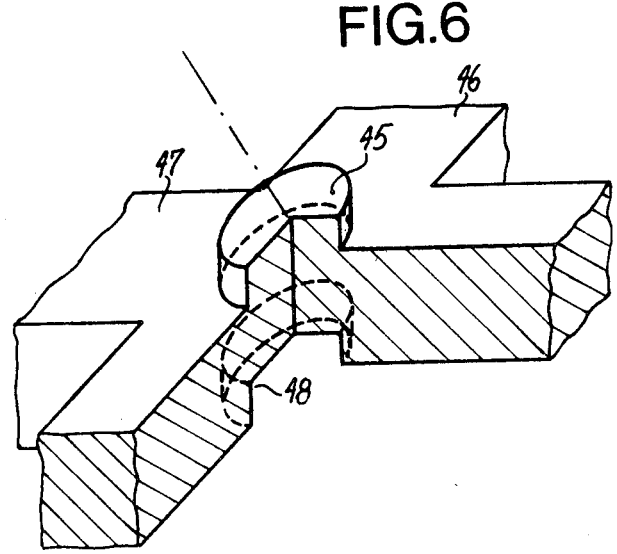
FIG. 6 is a perspective view, with partial sections, of a detail of an element of the pile-up in FIG. 5.

FIG. 6 shows a cylindrical pin or projection 45 at a cross point of two bars 46 and 47 of the grid 35, on one face of the grid. On the other face of the grid, facing pin or projection 45, there is a cylindrical blind hole 48. Grid 35 thus comprises a certain number of coupling points formed of a pin or projection 45 and of a blind hole 48. The same is true of the other grids of pile 34. Those coupling points are provided in order to ensure a good positioning of the superposed grids. A pin or projection 45 of a lower grid lodges itself into a corresponding hole 46 of the immediately higher grid. Of course, the distribution of the cross points takes into account the fact that from one level to the other, the direction of the grids changes. Hollow intervals are provided between the parallel grids of one level. The pins or projections and the holes are manufactured during the "molded-over" operation of the beams 36 to obtain the grid. Pile 34 thus obtained is rigid and solid and, in addition, is practically dustproof.

In FIG. 5, a pile 34 comprises eight levels.

In practice, in an application with a transmission circuit distribution unit, it is necessary to pile up fourteen levels, this, with the above-indicated numerical data, corresponds to a matrix thickness of 35 mm. In an application to a subscribers' line distribution unit, only four levels are necessary, this leading to a thickness of 10 mm.

Figure 7:
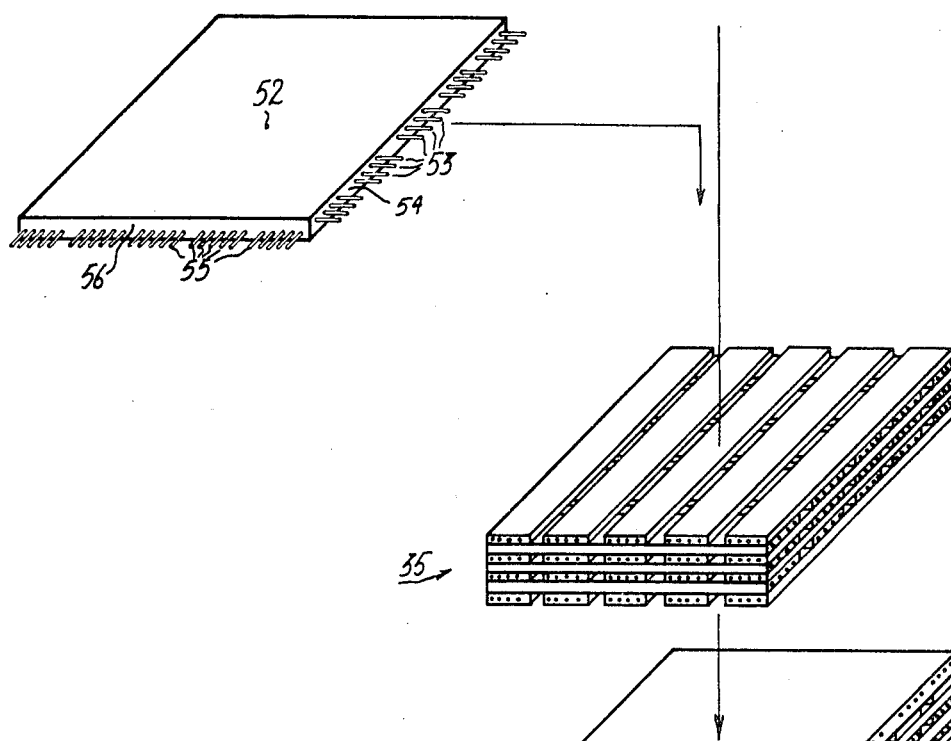
FIG. 7 is an exploded view, schematic and in perspective, which illustrates the construction of the pile-up in FIG. 5.

FIG. 7 symbolically represents a pile 35 which is covered with a control or governing module 52. The governing module supports the switching plug heads which are plugged into the holes of pile 35, at the time of the fitting into place of module 52. Module 52 comprises selection bars 53 which run through it from side to side. The first ends of bars 53 are visible on side 54 of the module. It also comprises governing bars 55 which run through module 52, from side to side, the first ends of which are visible on the side 56 of the module. It will be seen below how, by pushing or pulling those bars 53 and 55, it is possible to cause the rotation of the plugs by one quarter of a turn, either to the right or to the left, to close or open cross point contacts, in the matrix constituted by pile 35. The sections of bars 55 are inverted T-shape, the cross bars of the T's holding back the heads of the plugs.

Module 52 is, in addition, fitted on its upper face with pins or projections (not shown) of the type of 45, and it presents holes 48 in its lower face. Thus, by means of its holes 48, the module 52 comes to really fit over the first level of 35.

Figure 8:
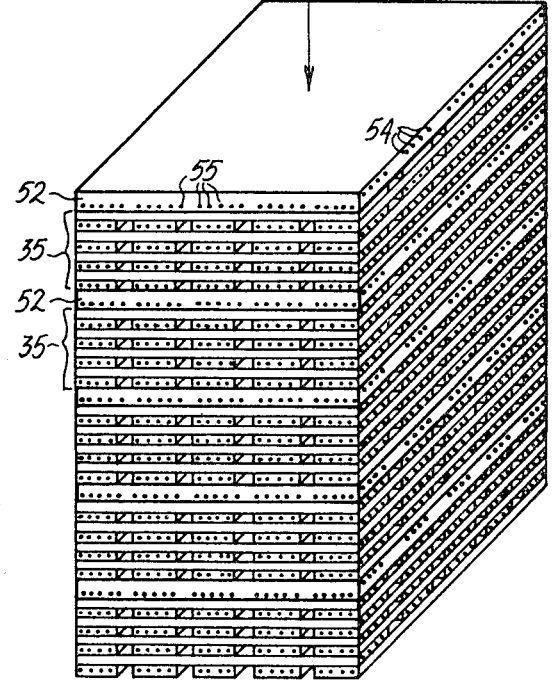
FIG. 8 is a schematic view, in perspective of a column formed by the superposition of pile-ups according to FIG. 7.

FIG. 8 shows that it is possible to constitute columns of piles 35, respectively topped with their control modules 52, piled up on top of one another. The pins or projections 45 of the modules 52 make possible the accurate positioning of the immediately higher pile. Of course, such a column is possible only because bars 53 and 55 of the governing modules are accessible from the sides.

CROSS POINT OPERATION FIGS. 9-10

Figure 9A:
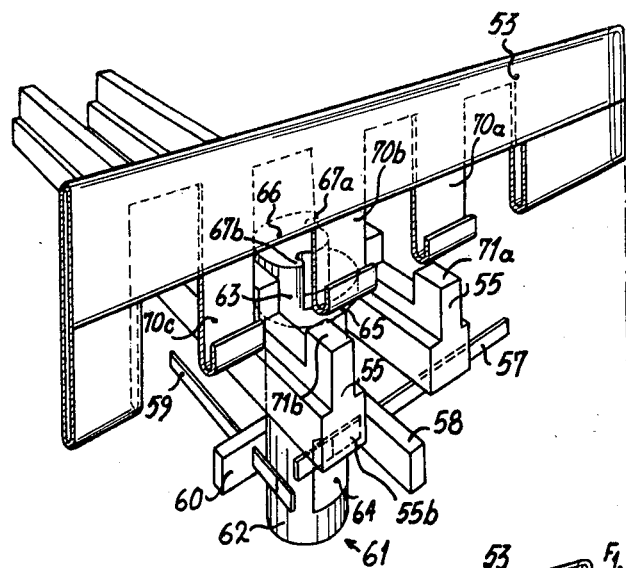
FIGS. 9A to 9C are perspective, stop motion views of a governing cross point of one embodiment of a governing or control module which is usable with the pile-ups in FIGS. 7 and 8, in three different states of operation, i.e. unoperated, operate, and release, respectively.
Figure 9B:
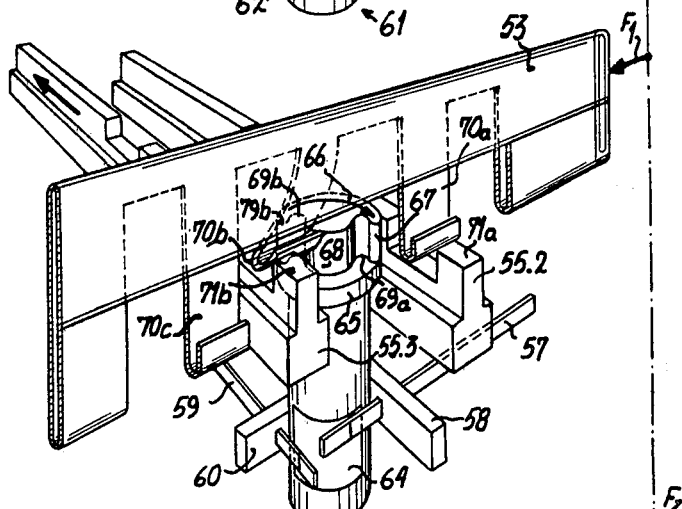

FIGS. 9A to 9B illustrate the structure of a governing or control module 52, as well as its functioning. In FIG. 9A there is a conductor beam 57 carried by a bar 58 of a grid 35. A conductor beam 59 carried by a bar 60 of another grid 35 is placed under the first one and oriented in a direction which is perpendicular to it. A plug 61 is constituted by a body 62, similar to 23, and a head 63. Body 62 has a small contact blade 64, similar to contact 25. Head 63 comprises a low cylindrical part 65, which rests on the edges of the inverted T-shaped governing bars 55 which are adjacent to each other. A higher part 66, in the shape of a crescent, presents a cylindrical swelling in its center.

FIG. 10, which is a plan view, schematically shows a certain number of heads 64, showing, for each one, a crescent 66 comprising a cylindrical external part having the same diameter as part 65, two horns or tips 67a and 67b, as well as the cylindrical swelling part 68, the axis of which is the same as the axis of cylinder 65. Each end of tip 67a or 67b is connected to a cylindrical center section 68 by means of a concave surface, as shown at 69a and 69b. As it will be seen later, the ends of horns or tips 67a, 67b play a direct path in the switching operation of the plug, while the central part 68 is preserved only to make the crescent less fragile.

FIG. 9A, shows a selection bar 53 and two governing bars 55a and 55b. Selection bar 53 is parallel to beam 57 while bars 55a and 55b are parallel to beam 59. More specifically, bar 53 is located in the vertical plane of the bar (not shown), parallel to bar 60, on the other side of plug 61. Bar 55a is located in the vertical plane of bar 58, and bar 55b is located in the vertical place of the bar, not shown, parallel to bar 58 on the other side of plug 61.

Selection bar 53 has the shape of a comb, the teeth of which, 70a, 70b, 70c, etc. are flexible and are placed at a distance or equal to the step or pitch which is the grids. The back of comb 53 is located approximately above the top of the heads 64 of the plugs 61. The teeth are long enough for their lower part to be at the level of horns or tips 67a and 67b, but above base 65. Each governing bar 55a or 55b carries rigid teeth, such as 71a and 71b, which are distributed along the bar with the same step or pitch as the grids. The bottom of bar 55a or 55b is below the base 65, and the top of teeth 71a or 71b is at a level higher than the bottom of teeth 70a, 70b.

In an unoperated position of rest, as shown in FIG. 9A, the selection bar 53 is placed in such a manner that each tooth 70a, 70b, 70c, etc. is respectively located to face the axis of a plug 61. The governing bars 55a, 55b are placed so that the teeth are respectively located facing the axes of the plugs. The width of a tooth 70a, 70b, etc. is such that in the indicated position the governing bars 55a, 55b can be displaced without the teeth 71a, 71b touching teeth 70a, 70b, but the bars run freely between the teeth. Reciprocally, in the position indicated, the bar 53 may be displaced with its teeth running between the teeth of the governing bars.

Moreover, in an unoperated position of rest, plug 61 is in a position such that horn or tip 67a is further away from tooth 70b than is horn or tip 67b. The small contact blade 64 then is in contact with only beam 57 and electrical current cannot pass from beam 57 to beam 59.

The view in FIG. 9B illustrates the functioning of the switching which causes plug 61 to pass from its rest position to its working or operated position. Bar 53 is first pushed into the direction of arrow F1, by means which are not shown, so that the part of tooth 70b which was facing horn or tip 67a will come to face horn or tip 67b. The other part of teeth 70b then is in front of tooth 71b and of work bar 55b. Then, bar 55b is pushed, in the direction of arrow F2, so that tooth 71b will push the flexible arm of tooth 70b which comes into contact with horn or tip 67b of the plug head, and then pushes that horn or tip, this causing the rotation of plug 61. The trajectory of the work bar 55b is such that horn or tip 61 rotates by one quarter of a rotation, so that small contact blade 64 comes into contact both with beams 57 and 59. The current can pass from beam 57 to beam 59. Afterwards, bar 55b is released so that it again assumes its initial position in FIG. 9A, for example, under the action of a recoil spring which is not shown. In the same manner, selection bar 53 is released and returns to its initial position, for example, also under the action of a recoil spring. Plug 61 maintains the position it has reached during the switching operation, so that the contact is maintained without any external input of energy, and without causing any mechanical stress, as is the case in some switches in which an element remains wedged in an extension position.

Figure 9C:
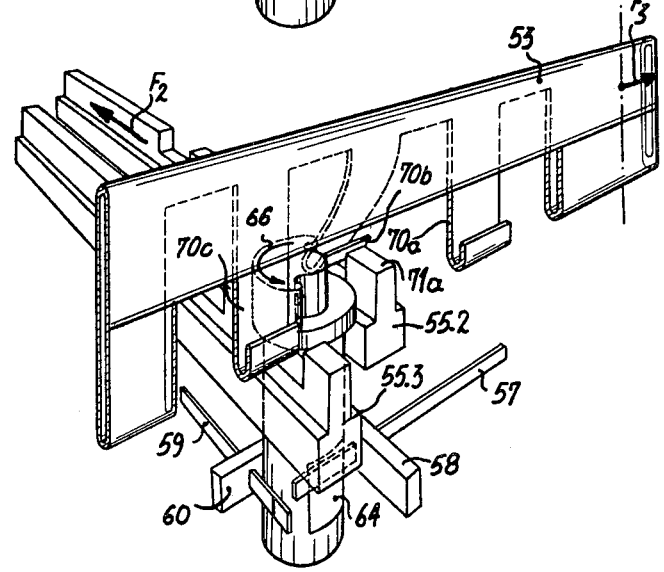

The view in FIG. 9C illustrates the cross point release operation of the switching which causes plug 61 to pass from the operated state to the unoperated state. Bar 53 is first pulled in the direction of arrow F3, by means which are not shown, so that the part of tooth 70b which was, at rest, facing horn or tip 67b will come to face horn or tip 67a. The other part of tooth 70b then is located facing tooth 71a of work bar 55a. Afterwards, bar 55a is pushed, in the direction of arrow F2, so that tooth 71a pushes the flexible arm of tooth 70b, which comes into contact with horn or tip 67a of the plug head, then pushes that horn or tip, this causing the rotation of plug 61. The excursion of work bar 55a is such that plug 61 rotates backwardly by one quarter of a rotation, so that it again assumes the rest or unoperated position indicated in FIG. 9A. Afterwards, the selection (53) and work (55a) bars are released, as described with respect to FIG. 9B.

FIG. 10 partially shows a matrix of heads of plugs 61, associated with a set of selection bars 53.1, 53.2, 53.4, . . . and a set of work bars 55.1, 55.2, 55.3, . . . . This configuration makes it possible to illustrate the operation of a module 52. The selection bars 53.1 to 53.5 are each represented by means of a small horizontal rectangle, on the right side of the matrix, with, in its horizontal extension, horizontal double lines which symbolize the flexible teeth 70 of the bars. The work bars 55.1 to 55.6 are each represented by a small vertical rectangle, under the matrix. In its vertical extension, a series of small vertical rectangles symbolize the rigid teeth 71 of the bars. The vertical line 72 indicates the position of the ends of the selection bars and the horizontal line 73 indicate the ends of the work bars at rest. Bar 53.2 has been pushed toward the matrix, into the position indicated in FIG. 9B. Then, work bar 55.5 was pushed as in FIG. 9B so that the head of the plug of the second line and of the fourth column has been turned in the direction of the arrow, that is to say, set to the operated position. Bar 53.4, on the contrary, has been pulled toward the outside of the matrix, and bar 55.2 was pushed, as in FIG. 9C. The head of the plug of fourth row and of the second column is now turned in the direction of the arrow, that is to say, set to the rest position.

It can be seen that the number of selection bars is equal to the number of lines of the matrix, as is the number of teeth of a work bar. The number of work bars is equal to the number of columns of the matrix, plus one, as is the number of teeth of a selection bar. This explains that in FIG. 7, for module 52, there are represented a series of four bars 53 on side 56, and series of five bars 55 on side 56.

It can be seen that the piles of contacts which have been described with reference to FIGS. 5 and 8 make it possible to plan for levels having any surface, and to have any number of contacts per cross point, by piling up the necessary number of levels. It is thus possible to build matrices with one pair of contacts per cross point for use in the telephone subscriber distribution units, or with three pairs of contacts plus one, per cross point for use in circuit distribution units. In addition, as shown in FIG. 5, each level may be manufactured in a modular manner, the base modular element 35 being composed of a layer of parallel conductors with a step or pitch of p. The connection of the inputs and of the outputs can respectively be done on the faces of the parallelepipede in FIG. 8, which corresponds, respectively, to the sides 56 and 54 or modules 52. The two other faces possibly serve for the testing of the circuit system, as well as for the governing of bars 53 and 55.

SWITCHING BAY ASSEMBLY FIGS. 10-16

Figure 11:
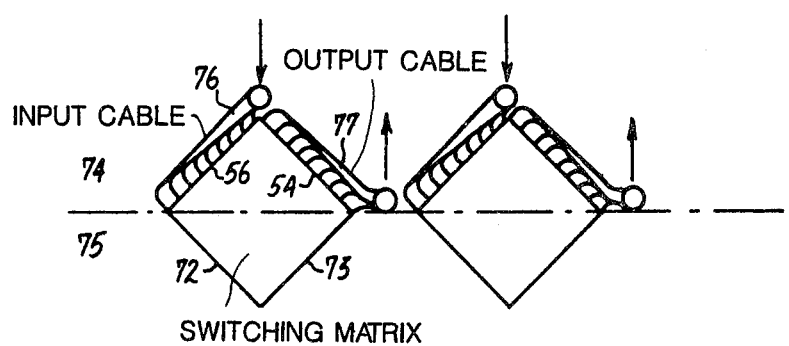
FIG. 11 is a schematic view taken in a plane, looking down on the tops of the two adjacent columns, according to FIG. 8, with its connecting cables.

FIG. 11 places in evidence the advantages of that type of pile. If the pile is divided along an axis running through a diagonal line leaving sides 54 and 56 on the same side, two zones 74 and 75 are formed. That is to say, zone 74 may be alloted to the line and use by installation personnel, and zone 75 may be reserved to the exploitation network. In zone 74, side 56 receives the input cable conductors 76, and side 54 receives the output cable conductors 77 which extend toward the main switchboard. Some of the inter-matrices connections can be executed in the plant. The other two sides, 72 and 73 are set aside for controlling, governing, or supervising and for tests (interruption of the connection, execution of shunts, etc.).

Figure 12:
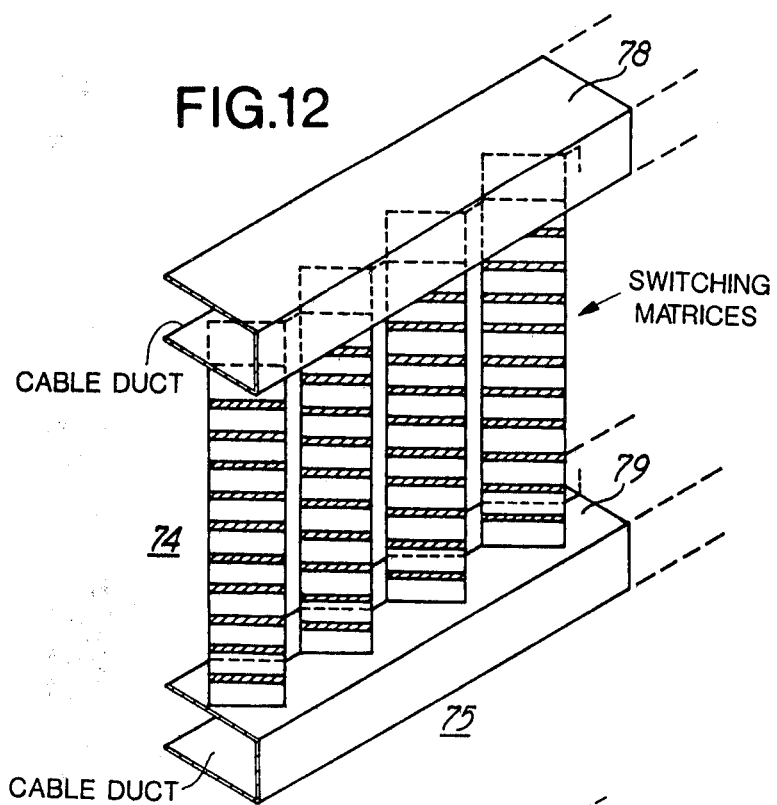
FIG. 12 is a schematic view, in perspective, of a first embodiment of a complex of switching columns, according to FIG. 8.

FIG. 12 shows a series of piles such as in FIG. 8, vertically assembled between two paths of cables 78 and 79, respectively for the input cables 76 and for the output cables 77. The piles are oriented with their diagonals lined up, leaving, all of them, on one side the installation zone 74 and, on the other side, the exploitation zone 75.

Figure 13:
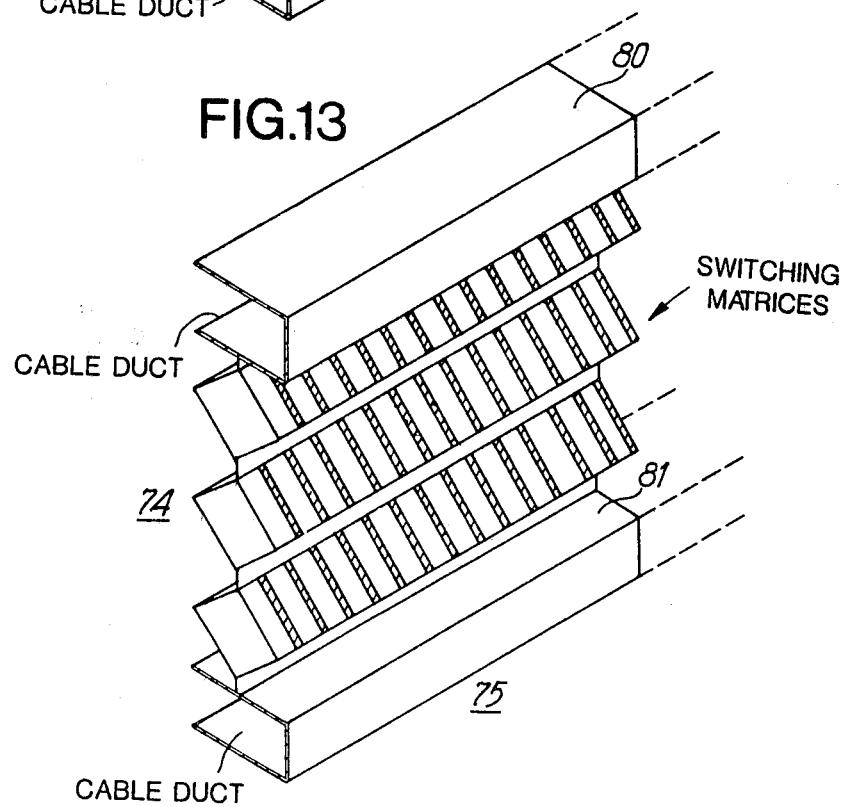
FIG. 13 is a schematic view, in perspective, of a second embodiment of a complex of switching columns according to FIG. 8.

FIG. 13 shows a series of piles such as those in FIG. 8, horizontally assembled on means which are not shown, between two paths of cables 80 and 81 which are similar to cables 78 and 79. The diagonal planes of the piles are lined up to separate the zones 74 and 75.

Figure 14:
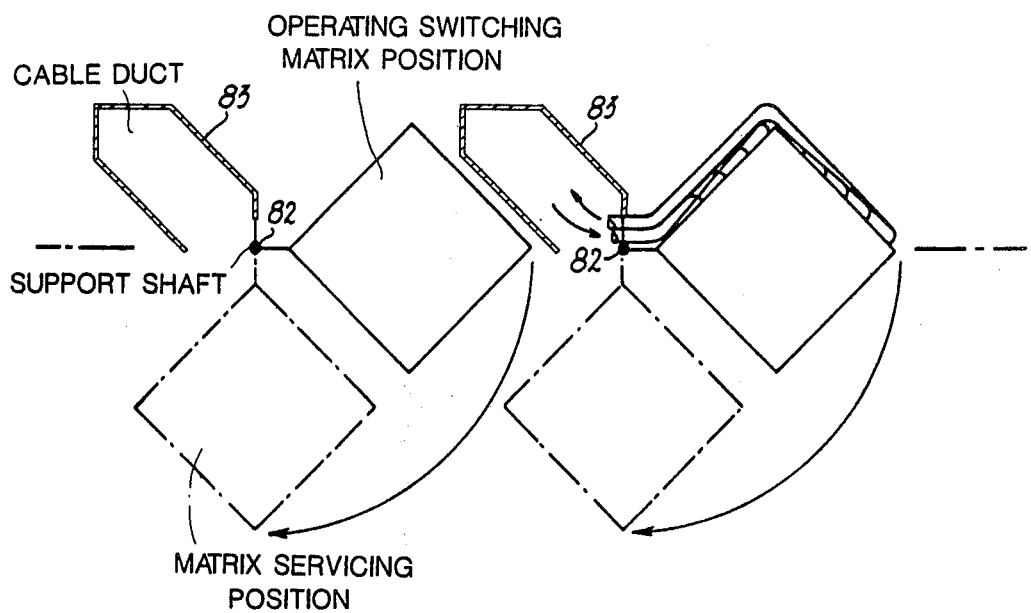
FIG. 14 is a schematic view, taken in a plane, of an assembly of columns according to FIG. 8.

In practice, as a function of the level of automation desired, it is possible to provide for several variations for exploitation. FIG. 14 shows two distribution units formed of piles such as in FIG. 8, in which matrices are assembled on a vertical axis 82 which makes it possible to extract them from the pile by causing them to rotate, as indicated by the arrows, in order to have access to the entire surface of each matrix when it is desired either to set or to break a connection by action on the heads of the plugs. The cables are run through a channel 83 and, therefore, are subjected to torsions at each rotation of the matrix (as indicated by an arrow).

Figure 15:
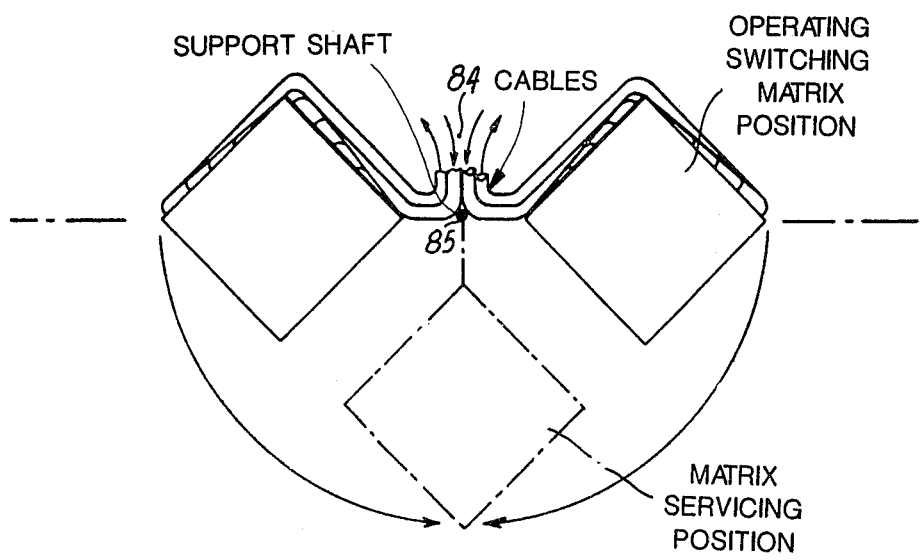
FIG. 15 is a schematic view, taken in a plane, of a variation of the assembling in FIG. 14.

In another embodiment in FIG. 15, each opening comprises two piles of matrices within the rear, in the central part, the cable paths 84. The inventive principle remains the same. The matrices are articulated on the same vertical axis of shaft 85, being placed symmetrically relative to the axis. That arrangement in FIG. 15 is supposed to occupy less space than the one represented in FIG. 14.

Figure 16:
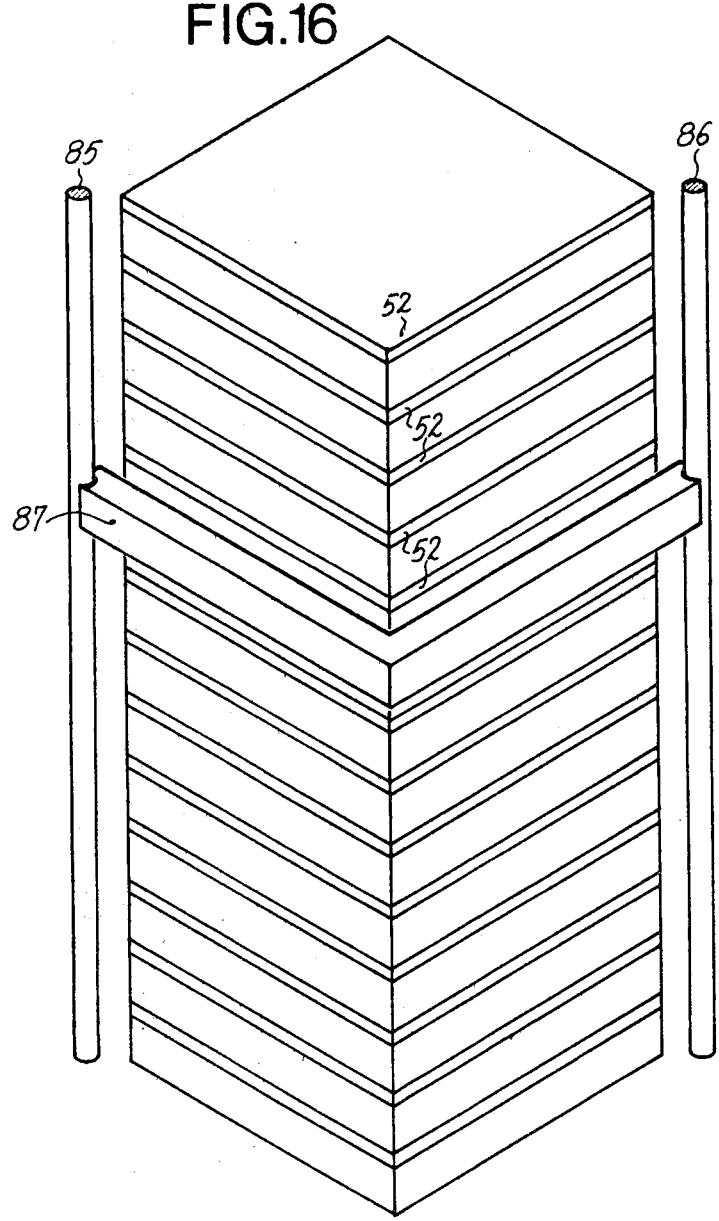
FIG. 16 is a schematic view of a selection governing device to be used with a column in FIG. 8.

With reference again to the structure in FIG. 12, FIG. 16 shows an entirely automated distribution unit opening, the visible face of the pile being part of an exploitation zone. The matrices are fixed. In front of the pile is assembled, between two rails 85 and 86, a maneuver member 87. Member 87 is a right angle, the plane of which is perpendicular to that of rails 85 and 86. Therefore, it is parallel to the plane of the levels of matrices or also to the plane of the control or governing devices 52. Rails 85 and 86 may be fitted with tooth racks on which rolling toothed wheels are assembled at the end of the sides of angle 87. It is possible to position member 87 in front of any one of the devices 52. Once set in position, member 87 contains means, such as windings or coils with core (not shown) in a number equal to the number of the work bars and of the selectric bars. Each core hooks onto the bar corresponding to it. A selection system selects the coils to be operated in one direction or in the other, to push or to pull the corresponding bar. Thus, to cause the switching of a plug in a matrix, suitable windings or coils are selected and energized as has been seen with respect to FIGS. 9B, 9C and 10.

MODIFICATION FIGS. 17, 18

Plug 88 in FIG. 18 corresponds to a variation of plug 49 in FIG. 2. It also comprises a cylindrical body around which are provided circular contact rings 89 having the same height as contact 25, and separated from one another as are contacts 25, 26 and 27. Head 90 of plug 88 has a special shape which makes it possible to raise it or to push it down into a pile, as will be seen in detail below.

Of course, the use of plugs 49 or 88 practically imposes the requirement that their number be equal to that of the cross points of the matrix. As will be seen below, the high number of plugs with control by rotation, such as seen at 22 (FIG. 4), is compensated by the possibility of governing them from a single lateral face of the pile and, even to do so automatically.

STEP-BY-STEP EMBODIMENT FIGS. 19-28

FIG. 19 symbolically represents a pile 33 which is topped with a controlling or governing module 91. The governing module tops the heads of switching plugs fitted into the openings of pile 33 at the time of the placing of module 91.

In fact, the governing module 91 presents the shape of a cover formed of juxtaposed grooves 92 which serve as guiding elements for a switching member. It will be seen below how, by introducing a switching member into those grooves 92, it is possible selectively to cause the rotation of heads 24 of the plugs.

Starting from the light and looking at FIG. 19, it is possible to constitute columns of piles 33, respectively topped with their governing modules 91. It will be noted that grooves 92 of the covers are all oriented in the same direction, to enable an easy access from a single face.

As shown in FIG. 17, the head 93 of plug 94 comprises a low cylindrical part 95, and a high part in the shape of circular sector 96, which presents a cylindrical swelling 97 in its center. The center of cylindrical swelling 97 is topped by a cone-shaped knob 98. Of course, the body of the plug, the cylinder of 95, that of 97 and cone 98 rotate around the same axis. The sector part 96 is limited by planes 99 and 100 which form between themselves an angle at the center slightly less than 180°.

FIGS. 20A to 20C show a switching member 101 introduced into a groove 92 of a cover 91 to switch, by rotation, one of the plugs of pile 33, associated with cover 91. FIG. 20A is a section view, taken along line XXA—XXA, in FIG. 20B; FIG. 20B is a section view along line XXB—XXB in FIG. 20A, member 101 being drawn, but assumed to be transparent; and FIG. 20C is a vertical section view along line XXC—XXC in FIG. 20A.

It can be seen that the cylindrical parts 95 of plugs 102 to 105 rest on the edges of the meshes of grid 106 which supports the layer of wires 107. Grid 106 rests on a grid 108 which supports the layer of wires 109. Partitions 110 form the grooves 92 of the cover 91 and rest on the edges of the meshes of grid 106 which are parallel to wires 107. The width of a wall of partition 110 is less than that of the bars of the grids, one vertical face of each partition falling practically vertical to the vertical face of the bar adjacent to wire 107. The other face of the partition falls approximately at the middle of the bar. Thus, the cylindrical parts 95 can rotate freely. The shift of each partition is explained by the fact that, in each mesh, the plug also is off-center, as seen in FIG. 4.

The height of member 101 is practically equal to the distance between the plane formed by the summit of cones 98 and the upper end of each groove 92. The width of member 101 is equal to the internal width of grooves 92.

Member 101 is composed of a central beam 111, the section of which is I-shaped, and of two flat governing rods 112 and 113, placed on each side of the core of I-shaped beam 111. The sum of the thickness of rods 112, 113 and of the core of 111 is equal to the thickness of the flanges of the I. The upper flange of the I bears against the back of groove 92. The end 114 of the part 111, introduced into groove 92, is bevelled to make its introduction easier.

Near the end 114, the two sides of the lower flange 115, are cut out over a given length, the core of 111 is pierced from side to side, and opening 116 thus obtained, serves as a cam groove for two studs 117 and 118 respectively fixed in the heads 119 and 120 of the ends of rods 112 and 113. Heads 119 and 120 respectively have hooks 121 and 122 which are downwardly directed and oriented to exert a traction toward the entrance of groove 92. Heads 119 and 120 and the bodies of the rods are joined by parts 123 and 124 of reduced height relative to the height of the rods bodies, thus making them very flexible, so that hooks 121 and 122 can be lowered on each side of core 111, where the flange 115 is cut out.

Opening 116 presents the shape of an S-shape with the top 125 of the S directed toward end 114 and the bottom 126 of the S directed toward the entrance of the groove, the low part 126 of the S comprising, moreover, a horizontal rectilinear excursion 127.

When, as shown in FIGS. 20A and 20B, rod 112 is pulled, in the direction of arrow F1, toward the outside of the groove, stud 117 moves inside the S-shaped groove 116 so that the tip of hook 121 moves down below the level of flange 115, as far as the level of part 96 of the head of plug 104, in the example which has been shown. During the end of the horizontal excursion of stud 117, hook 121 meets plane 99 of the head of plug 104 which operates in the counterclockwise direction. During the rotation, plane 99 rotates, then it escapes from the action of hook 121. Then, the rod is pushed back again to take its rest position, plane 99 obviously is not driven along, and stud 117 moves back up into groove 116, so that hook 121 can move back up above flange 115. It is then possible to move member 101 in groove 92 without causing any motion of the heads of plugs 102 to 105.

When it is desired again to change the state of plug 104, that is to say, to cause it to rotate clockwise, member 101 is introduced into the corresponding groove 92 until the heads of rods 112 and 113 slightly project beyond the head of plug 104. Rod 113 is then pulled, to cause stud 118 to describe the S-shaped movement caused by slot 116; hook 122 then moves downwardly and meets plane 100 on the head of the plug, which is driven along until plane 100 escapes from the point 122. There is the expected rotation.

As shown in a larger scale in FIGS. 21A to 21C, the planes 99 and 100 form an angle such that the rotation of the plug is, at each switching, either + or−90°. In the example described, the distance between rods 112 and 113 (FIG. 20B) is barely greater than the diameter of the cylindrical swelling 97. As the radius of swelling 97 is practically one half that of plug head 95, the angle formed by planes 99 and 100 is very slightly less than 180°.

The cone-shaped ends 98 (FIG. 20A) limit the contact surface with member 101 during the translations of the latter in the groove, and they limit, therefore, the parasite torques which might have a tendency to cause any rotation of non-selected plug heads.

Finally, the rods 112 and 113 are held laterally against the core of beam 111, by two side plates 128 and 129. The sum of the thickness of plates 128 and 129, and of the width of the flange of member 111 is equal to the width of one groove, with the necessary play.

The schematic top view in FIG. 21A shows the head of plug 104 at rest (i.e. unoperated cross point), as are rods 112 and 113. The hooks 121 and 122 have been represented by means of shaded squares. In FIG. 21B, rod 112 has been pulled and hook 121 has driven so that the head has rotated by +90%. It must be noted that the width of the core of 111 is practically equal to the diameter of the central part 97 of the plug head. Therefore, when rod 112 is pushed back to assume again its rest position, hook 121 can touch the lateral surface 97, but it does not drive the head into rotation. In FIG. 21C, rod 113 has been pulled and, in a similar manner, it causes the rotation of the head by—90%.

As represented in FIG. 20A, in order to perform a correct maneuver, the longitudinal position of the switching member in the groove must be such that the anterior part of the horizontal excursion 127 of S-shaped slot 116 is slightly in front of plane 98, while the posterior part of 127 is behind plane 99, or vice-versa, depending on the orientation of the head. It is assumed that member 101 is moved by a step-by-step motor, the step of which is equal to the positions of the plugs. It must be noted that the cut-outs in flange of member 115 have a length which may be less than double the step of the plugs, and that they are practically centered on the plug which is to be switched.

HAND TOOL FOR STEP-BY-STEP EMBODIMENT FIG. 29

FIG. 22 schematically represents a member 101 in front of grooves 92 of a switching module 91. Arrow F2 suggests the first lateral motion to bring member 101 in front of the selected groove, and arrow F3 suggests the longitudinal motion of the member into the groove to bring the cut-outs of 115 above the head to be switched.

In FIG. 23, a pile 33 is topped with a cover 91, in which all of the plugs are oriented with their heads up, as indicated in the left side of the drawing. The step of the grooves then is equal to the step of the plugs in their grids. On the other hand, in FIG. 24, a pile 33' is topped with an upper cover 91', and which rests on a lower cover 91'', in which the plugs are alternately oriented with their heads up and their heads down, as indicated in the left side of the drawing. The step of the grooves in modules 91' and 91'' then is equal to double the step p of the plugs, that is to say 2p. The arrangement in FIG. 24 makes it possible to use heads 93' of a more important diameter, this presenting the advantage of multiplying by two the active torgue, when rods 112 and 113 of the switching members are operated.

FIG. 25 schematically represents in perspective, a series of piles in FIG. 9, vertically assembled. Piles 130 are oriented in a manner such that their diagonals are lined-up, all of them leaving on one side the installation zone 131 and on the other side the operation zone 132. In a schematic manner, an automat 133 may be displaced on a rail 134 parallel to openings or sections 130, as indicated by arrows F4. The openings of sections 130 are fitted with vertical tracks or tooth racks 135 which make it possible to ensure the displacement, in the vertical direction, of automat 133 which carries a switching member 101, which member can be literally displaced as well as longitudinally. It is also assumed that automat 133 comprises means to pull and push the rods 112 and 113 of member 101.

Automat 133 makes it possible to select the opening or section, to select the module 91 for switching in the section, the groove 92 in said module 91, to introduce member 101 into the groove, to govern the suitable rod to execute either a connection or a disconnection, and then to remove member 101 from the groove. After an operation, the automat can return to the foot of the opening or section. For all of those operations, step-by-step motors may be provided for in the automat. It clearly appears that the positioning of a switching member may be entirely automatic, as is the manuever of rods 112 and 113. From the above, the switchings inside the distribution station may be entirely automated, thus presenting an important advantage.

FIG. 26 shows the advantage of that type of pile. Two zones 131 and 132 are formed, zone 131 being reserved for the line and installation teams, and zone 132 being reserved to the exploitation service. In zone 131, side 136 receives the input cable conductors 137, and side 138 receives the output cable conductors 139 going to the central switchboard. Some inter-pile connectors may be executed in the plant. Side 140 is reserved for the control or governing and the tests.

FIG. 27 shows an example of a bay or opening consititued by two rows of openings 130 which can be placed back to back. That very compact arrangement requires the displacement of the modules which can be piled up (See arrow F5) during the connecting of wires.

FIG. 28 represents another example of a bay with two rows of openings 130. That arrangement is staggered to make possible a direct access to the input cables 137 and output cables 139.

FIGS. 29A to 29D schematically represent a manual intervention tool 141 which makes it possible to operate the heads of plugs, as would a member 101.

Tool 142 comprises a member 101 mounted, in the manner of a pistol barrel, to the stock 142. The external ends of rods 112 and 113 are subjected to the action compressed springs 143 and 144 which tend to push them back toward end 116. Stock 142 is fitted with a trigger 145 which makes it possible to push a lever 150 toward the rear of the tool, as indicated by arrow F6. In addition, a slider 146 is mounted astride the rear part of 101. Slider 146 presents a slot 147 opened upwardly, in the general shape of an S. The center of the S is perpendicular to the median plane of rods 112 and 113. The ends of the S are straight and parallel to the axis of 101, one, 148 above rod 112 and the other, 149, above rod 113. Lever 150 is solidly connected to trigger 145 and has its upper end passing slot or groove 147. When slider 146 is pushed forward, the tip of lever 150 is shifted toward rod 112. When, under those conditions, trigger 145 is depressed, lever 150 comes to hit against the curved plug head as described with respect to FIGS. 20A and 20C. When slider 146 is pulled rearwardly, the tip of lever 150 is shifted toward rod 113. When, under those conditions, trigger 145 is depressed, lever 150 comes to hit against the curved part (toward 112) of rod 113, so that rod 113 is pulled and can operate a plug head.

On the rear of anterior part of member 101 there is mounted another slider 151 which makes it possible to define the sinking of member 101 into a groove 94, this making it possible to select the plug head which is to be switched. More particularly, FIG. 29A shows gun 141 in the state of rest, slider 146 being correctly positioned so that heads 75 and 76 symbolically represented by a square 152 can be located, once the member has sunk in, above the head to be switched.

Figures 29A, 29B, 29C, 29D:
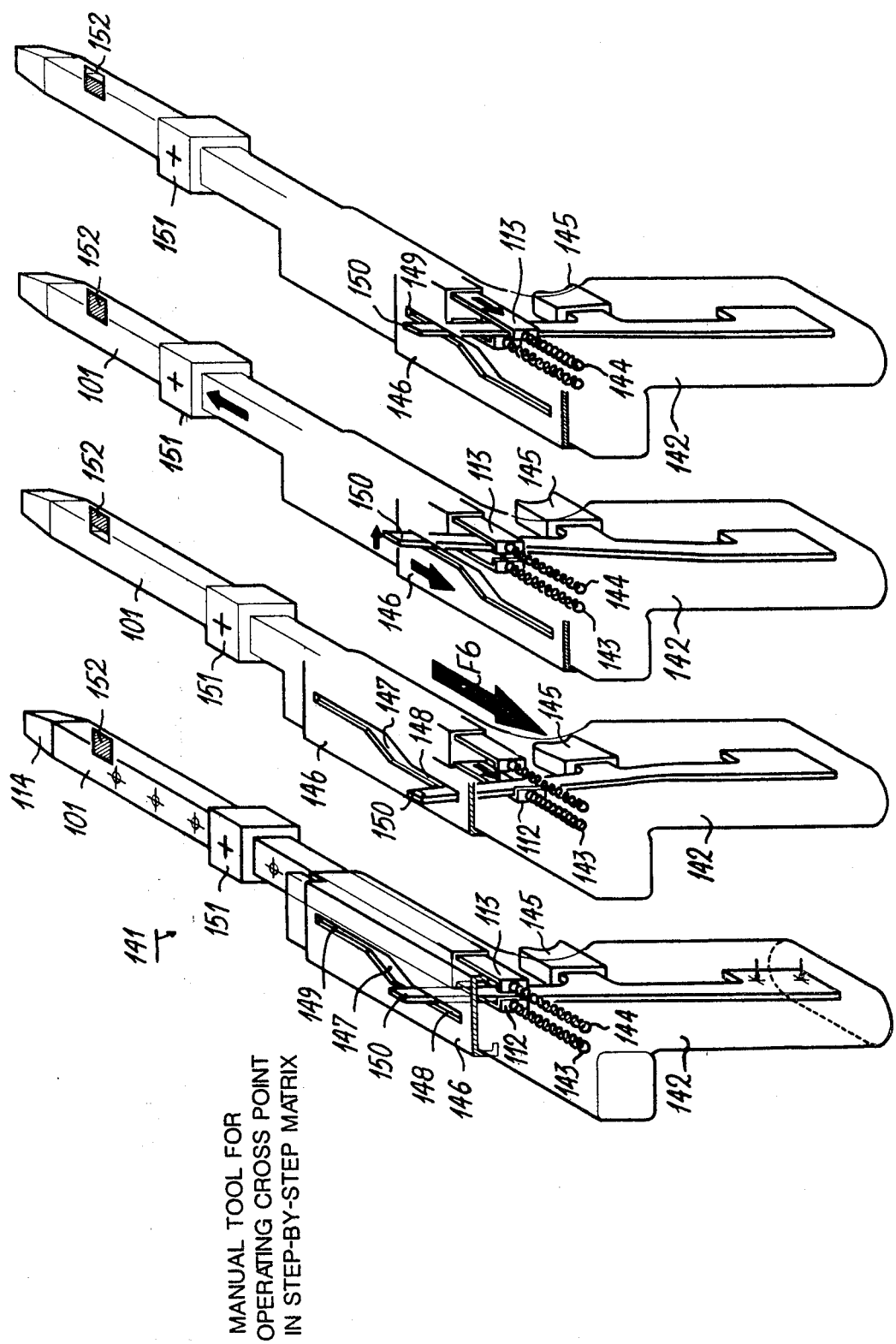

FIG. 29B shows the position of slider 146 to perform a connection operation, trigger 145 being capable of pulling rod 112.

FIG. 29C shows the position of slider 146, pulled rearward, to prepare a disconnection operation.

FIG. 29D shows the trigger 145 on lever 150 which drives along rod 113 for a disconnection operations.

MODIFICATION OF STEP-BY-STEP EMBODIMENTS FIGS. 30 33

FIGS. 30A to 30C show a variation of plug 88 in FIG. 18, in three different states: unoperated and at rest, when passing to its operated position of work and when passing to its released position of rest. Plug 153 in FIGS. 30A to 30C is different from plug 88 by the shape of its contact 154 which is not circular, but L-shaped in the reversed position, the leg of the L ensuring the electric continuity with wire 156 of the second perpendicular layer. Of course, plug 153 is fitted with as many contacts 154 as there are cross points to close. Head 90 of plug 153 presents the shape of a vertical rectangular frame the large sides of which are parallel to the axis of the plug, and the vertical axis of symmetry of which corresponds to the axis of the plug, and the vertical axis of symmetry of which corresponds to the axis of the plug. The small sides 157 and 158 of head 90 have a cross-section presenting a convex rounded part toward the inside of the frame. The surface defined by each rounded part serving as contact surface with a finger of a switching member.

In FIG. 31A, plug 153 is at rest, that is to say in a high position. Contact 154 is in contact with the high wire 155, but not with the low wire 156. The cross point is not closed.

In FIG. 31B, a finger, represented by arrow F8 pushes the boss 157 downwardly so that plug is lowered and contact 154 comes into contact with the low wire 156, while remaining in contact with the high wire 155. The crossing point closes.

In FIG. 31C, another finger, represented by arrow F9, pushes boss 158 upwardly, so that the plug takes back the position it was occupying in FIG. 31A. The cross point opens.

FIGS. 31A to 31C show a switching member capable of operating plugs 153. First of all, it must be noted that plugs 153 cooperate with piles of grids identical with pile 33, which are associated with control or governing modules 159, similar to module 91. The height of module 159 is more important than that of module 91, to permit the lodging of heads 90 for one thing, higher than the heads 93 of the rotating plugs and for the other thing, subjected to a motion of vertical translation, as has just been described with respect to FIGS. 31A to 31C.

Governing module 159 is a cover formed of justaposited grooves 160 which serve as guiding elements for switching member 161 the general shape of which is similar to that of member 101. Grooves 160 are limited by partitions 162. Each partition 162 carries a first series of blocks 163 placed at the very bottom, on one side of the partition, and a second series of blocks 164, placed at the very top of the partition. In another embodiment, each groove 160 comprises a series of blocks 164 at the top and left when looking at FIG. 31C and a series of blocks 163, at the bottom to the right. The blocks are arranged in pairs, each pair comprising a block 163 and a block 164 which are in the same vertical plane which coincides with that of a grid bar of the pile. In other words, the pairs of blocks are placed with the same step or pitch as plugs 153. The vertical distance between the upper edge of the block 163 and lower edge of the block 164 of the same pair is equal, with the necessary play, to the height of the switching member 161. It must further be noted that partitions 163 have the same relative arrangement, with respect to the grid bars, as the partitions 110 in FIG. 20C.

Member 151 is composed of a hollow beam with a rectangular section, comprising two vertical side plates 165 and 166, and two horizontal plates 167 and 168. In the hollow part, between plates 165 and 166, are mounted two flat rods 169 and 170.

The width of member 161 is equal to the distance between the external faces of cheeks 165 and 166 with the necessary play and is equal to the distance between the end faces of plates 167 and 168, and is less than the distance between the bosses 157 and 158.

The end 171 of member 151 which is introduced into a groove, is bevelled. Near the end 171, plate 167 comprises an opening 172, which approximately faces rod 169. Plate 168 comprises an opening 173 which, approximately faces rod 170. Facing opening 172, the head 174 of rod 169 comprises a part 175 connected at 90° toward rod 170. Between head 174 and the body of rod 169, there is a flexible part of 176 the height of which is reduced. In the same manner, facing slot 173, head 177 of rod 170 comprises a part 178 folded toward rod 169. Between head 177 and the body of rod 170, there is a flexible part 179.

Near opening 172, side plate 165 comprises an opening 180 in the form of a widely open V, one high horizontal arm of which is directed toward the end 171 and the downwardly slanted arm of which ends just above opening 172. Head 174 of rod 169 is fitted with a stud 181 which is introduced into opening 180. When rod 169 is pushed toward tip 171, stud 181 is in the high part of opening 180, so that head 174 is high and that the folded part 175 is entirely inside the profile of member 168. When rod 169 is pulled toward the outside, stud 181 descends inside opening 180 and, as shown in FIG. 31A, it pushes the boss 157 of a plug 153 in the downward direction. Opening 180 has a shape such that the run of part 175, which serves as a pusher, will cause the plug head 90 (FIG. 30) to move downwardly until it comes into contact with the upper surface of sub-jacent grid 160. Once the plug has moved down, rod 169 is pushed back forward, stud 181 moves back up driving along head 174, but the plug head 90 (FIG. 30) remains in high position.

Reciprocally, near opening 173, side plate 166 comprises a slot 182 in the form of a widely opened V, which is symmetrical with opening 180, relative to the horizontal axis of symmetry of member 151. Head 177 of rod 170 is fitted with a stud 183 engaged in opening 182. As opening 182 is symmetrical with 180, when rod 170 is pushed toward tip 171, stud 183 is in the low part of opening 182 so that head 177 is low and that the folded or bent part 178 is entirely inside the profile of 151. When rod 170 is pulled toward the outside, stud 183 rises in the opening 182 and pushes the boss 158 upwardly. When the stud reaches its highest point, the plug head 90 (FIG. 30) is practically applied against the bottom of module 149.

It can really be seen that by operating rods 169 and 170, the crossing points are either opened or closed, as described with respect to FIGS. 31B and 31C. It must be noted that member 151, engaged in a groove 160, does not modify the positions of the heads of the plugs of the grooves, as long as the openings 172 and 173 have not been positioned above the head of the plug to be switched, switching being then performed by means of rods 169 and 170.

It will be noted that the spaces left free horizontally, across from blocks 163 and 164, make it possible for pushers 175 and 178 to move freely. Indeed, during their displacements, the flexible parts 176 and 179 cause the heads 174 and 177 to describe arcs of circles such that the pushers respectively pass in front of blocks 153 and 154.

It will appear or can be seen that members 151 may be operated exactly as are members 101 are operated, since it is sufficient to position them correctly in the longitudinal direction, then to pull one or the other of the governing rods. Especially, member 151 can also be mounted on a gun, such as the one described with reference to FIGS. 29A to 29D.

In FIG. 32, a pile 33 is topped with a module 149, in which all of the plugs are oriented with their heads at the top, as indicated in the left part of the drawing. Those plugs operate as described with respect with FIGS. 29A to 29B. As a variation, in FIG. 33, there have been represented two piles 184 and 185, symmetrical with respect to each other, and between which there is mounted, a control or governing module 186. Pile 184 may be identical with a pile 33. Plugs 187 used in this complex are composed of two contact-carrying rods mounted symmetrically on each side of head 90. There are used, in module 186, switching members 151. The operation of such a complex, with plugs 187, is obvious for the man of the art. That arrangement proves interesting when the number of contacts per crossing point is large.

We claim:

1. A switch with several layers of cross points, composed of several first layers of spaced parallel conductors oriented in a first direction and of several second layers of spaced parallel conductors oriented in a direction perpendicular to the first direction, the first and the second layers being interposed between each other, each layer of conductors being carried by a grid of insulating material, said grid of insulating material defining an orthogonal array of windows having perpendicular conductors exposed therein, plug means in at least some of said windows, a cross point comprising at least two superimposed adjacent layers and a conductor surface formed on an associated one of said plugs, the height of the conductor surface on said plug being sufficient to electrically connect a conductor segment of an upper conductor with a conductor segment of a lower conductor, each of said plug conductor surfaces occupying an angular sector in the order of 180°, and means for causing said plugs to rotate by one quarter of a rotation in one direction or in the other direction in order to open or close the cross point.

2. A switch according to claim 1 and work bars means having operating teeth, and orthogonally therewith, selection bar means with flexible teeth, the plugs comprising crescent-shaped heads having tips which cooperate with the flexible teeth of said selection bar means, means responsive to a selective operation of a work bar means and a selection bar means for deforming the teeth of a selection bar means, means responsive to operation of a work bar means for pushing each selection bar means in one direction, the deformed rotating tooth bearing on one of the tips for one plug by one quarter of a rotation in one direction, and pulling the selection bar means in the other direction for rotating said plug by one quarter of a rotation in the other direction.

3. A switch according to claim 1, wherein each of said grids comprises a plurality of parallel grid elements juxtaposition in one plane, each element of said juxtapositioned grids having a ribbon including a plurality of the conductors of the layer, said ribbons being cut off at a length corresponding to a length of the grid.

4. A switch according to claim 1, wherein the grids of the second layers are identical to the grid of the first layers, but are shifted by one quarter of a rotation relative to said grids of the first layers.

5. A switch according to claim 4 and a switching means comprising two parallel rods, each rod having an active end with a hook which can be lowered or raised in conjunction with a translation motion of the rod, the lowered or raised hook of a rod driving along one of two hooking faces formed on a said plug, thus causing said plug to rotate by one quarter of a rotation in one direction, the hook of the other parallel rod either lowering or raising for driving along the other of said hooking faces, thus causing the plug to rotate by one quarter of a rotation in the other direction.

6. A switch according to claim 5, wherein the active end of each rod presents a flat head connected to a body of the rod by a flexible part, said flat head carrying a stud engaged in a slot of a rigid plate of a control member, said slot having a vertical plane with an S-shape guide member for translating motion of the rod in the control member for causing a displacement of the stud in the slot to cause said stud to move downwardly or upwardly and then to complete its run by a simple translation motion, the hook describing a trajectory which is parallel to that of the stud.

7. A switch according to claim 6, wherein heads of the plugs comprise a low cylindrical part and a high part with a circular sector having a cylindrical swelling in its center, said sector having an angle at the center which is slightly less than 180°.

8. A switch according to claim 7, wherein the center of the cylindrical swelling is topped with a pivot point cone.

9. A switch according to claim 3 and switching means with two parallel rods, each having an active end fitted with a pusher which can be lowered or raised in response to a translation motion of the corresponding rod, said lowered or raised pusher driving against a lateral side of a frame which forms a head on a plug, said plug moving downwardly or upwardly.

10. A switch according to claim 9, wherein the active end of each rod has a flat head connected to the rod body by a flexible part, the head carrying a stud engaged in a guide slot having a shape of a V, such that the translation motion of the rod causes a displacement of the stud in the guide slot to cause said stud to move downwardly or upwardly, and then to complete its run by a simple translation motion.

11. A hand tool for the governing of a switching device member according to any one of the claims 5 to 10 wherein an end of the switching device member is accessible, said tool comprising a pistol-like device having a hand stock, means responsive to a movement of a trigger for selectively operating one of said rods through a mechanical switching within said hand tool.

12. A switch according to one of claims 5 to 10, wherein the switching means include members which slide in simple grooves having one of the layers of the conductors of the switch.

13. A switch according to claim 12, and means for moving said members forward step by step in the grooves in order to position active ends of the rods in a position facing a head of a plug selected to be switched.

14. A switch according to claim 13, wherein the members are mounted on automatic operating means comprising step by step motors, to displace then in the horizontal direction, and in the vertical direction to select a section of switches.

15. A switch according to claim 2, wherein each of said grids comprises a plurality of parallel grid elements juxtaposition in one plane, each element of said juxtapositioned grids having a ribbon including a plurality of the conductors of the layer, said ribbons being cut off at a length corresponding to a length of the grid.

16. A switch according to claim 2, wherein the grids of the second layers are identical to the grid of the first layers, but are shifted by one quarter of a rotation relative to said grids of the first layers.

17. A switch according to claim 3, wherein the grids of the second layers are identical to the grid of the first layers, but are shifted by one quarter of a rotation relative to said grids of the first layers.

18. A switch according to claim 11, wherein the switching means include members which slide in simple grooves having a step of the layers of the conductors of the switch.

* * * * *